(12) United States Patent
Greenblatt et al.

(10) Patent No.: US 9,279,412 B2
(45) Date of Patent: Mar. 8, 2016

(54) FLOW CONTROL ON A VERTICAL AXIS WIND TURBINE (VAWT)

(75) Inventors: David Greenblatt, Haifa (IL); Benyamin Sasson, Haifa (IL); Magen Schulman, Herzliya (IL)

(73) Assignee: Technion Research and Development Foundation Ltd., Haifa (IL)

(*) Notice: Subject to any disclaimer, the term of this patent is extended or adjusted under 35 U.S.C. 154(b) by 759 days.

(21) Appl. No.: 13/576,849

(22) PCT Filed: Feb. 16, 2011

(86) PCT No.: PCT/IL2011/000165
§ 371 (c)(1),
(2), (4) Date: Aug. 14, 2012

(87) PCT Pub. No.: WO2011/101847
PCT Pub. Date: Aug. 25, 2011

(65) Prior Publication Data
US 2012/0301296 A1 Nov. 29, 2012

Related U.S. Application Data

(60) Provisional application No. 61/304,842, filed on Feb. 16, 2010.

(51) Int. Cl.
*F03D 7/06* (2006.01)
(52) U.S. Cl.
CPC ........................................ *F03D 7/06* (2013.01)
(58) Field of Classification Search
CPC ............ F03D 7/06; F03D 3/005; F03D 7/042
USPC ...... 416/1, 36, 37, 41, 42, 90 R, 93 R, 231 R, 416/231 B, 232, 235; 415/4.2, 4.4
See application file for complete search history.

(56) References Cited

U.S. PATENT DOCUMENTS 4,504,192 A * 3/1985 Cyrus et al. .................... 416/41
5,209,438 A * 5/1993 Wygnanski ................... 244/203
(Continued)

FOREIGN PATENT DOCUMENTS

| CN | 1793643 A | 6/2006 |
|---|---|---|
| CN | 101323371 A | 12/2008 |
| GB | 2186033 A | 8/1987 |
| WO | WO 2009/053984 A1 | 4/2009 |
| WO | WO 2010/065956 A1 | 6/2010 |
| WO | WO 2010/093621 A1 | 8/2010 |

OTHER PUBLICATIONS

Abstract of Ferreira et al, "2D PIV Visualization of Dynamic Stall on a Vertical Axis Wind Turbine," AIAA Paper 2007-1366, 45th AIAA Aerospace Sciences Meeting and Exhibit, Jan. 8-11, 2007, Reno, Nevada.

(Continued)

*Primary Examiner* — Christopher Verdier
*Assistant Examiner* — Aaron R Eastman
(74) *Attorney, Agent, or Firm* — Roach Brown McCarthy & Gruber, P.C.; Kevin D. McCarthy

(57) ABSTRACT

A control system is presented for controlling operation of a vertical axis wind turbine (VAWT) for generating energy from an incoming fluid flow. The control system comprises at least one flow affecting arrangement associated with at least one blade of the VAWT and a control unit connected to said flow affecting arrangement, the flow affecting arrangement comprising two flow affecting units located in two opposite sides of the blade respectively at a leading edge thereof, each flow affecting unit being operable for creating a blowing jet at the respective side of the blade thereby inducing an increase in a fluid flow momentum, the control unit being configured and operable for selectively activating the flow affecting units in alternating fashion according to a predetermined time pattern to oscillate the blowing jet at the opposite sides of the blade.

33 Claims, 18 Drawing Sheets

(56) References Cited

U.S. PATENT DOCUMENTS

| | | | |
|---|---|---|---|
| 5,755,408 A * | 5/1998 | Schmidt et al. | 244/204 |
| 6,109,566 A * | 8/2000 | Miller et al. | 244/207 |
| 6,267,331 B1 * | 7/2001 | Wygnanski et al. | 244/204 |
| 7,354,247 B2 * | 4/2008 | Bonnet | 416/90 R |
| 7,537,182 B2 | 5/2009 | Greenblatt | |
| 7,628,585 B2 * | 12/2009 | Lee et al. | 416/1 |
| 2006/0060723 A1 * | 3/2006 | Greenblatt | 244/207 |
| 2006/0140760 A1 * | 6/2006 | Saddoughi et al. | 416/23 |
| 2007/0077145 A1 * | 4/2007 | Kinkaid et al. | 416/197 A |
| 2007/0224029 A1 * | 9/2007 | Yokoi | 415/4.2 |
| 2009/0097976 A1 * | 4/2009 | Driver et al. | 416/42 |

OTHER PUBLICATIONS

Greenblatt et al, "The control of flow separation by periodic excitation," Progress in Aerospace Sciences, vol. 36, No. 7, Oct. 2000, pp. 487-545(59).

Abstract of Greenblatt et al, "Effect of leading-edge curvature on separation control—A comparison of two NACA airfoils," $40^{th}$ AIAA Aerospace Sciences Meeting and Exhibit, Jan. 2002, Reno, Nevada.

Abstract of Greenblatt et al, "Effect of Leading-Edge Curvature on Airfoil Separation Control," AIAA Journal of Aircraft, vol. 40, No. 3, May-Jun. 2003.

* cited by examiner

FLOW CONTROL ON A VERTICAL AXIS WIND TURBINE (VAWT)

FIELD OF THE INVENTION

This invention relates to wind turbines, and more specifically, to a technique for controlling flow over a vertical axis wind turbine (VAWT) for the purpose of increasing the VAWT's efficiency in power production.

BACKGROUND OF THE INVENTION

The need for environmentally sustainable housing and cities is a major factor driving wind energy conversion systems for the built environment. One consequence of this is the reemergence of cross-wind-axis machines, most often oriented vertically and termed vertical axis wind turbines (VAWTs).

Much research was conducted on these machines until the 1980's, but with the increasing success of horizontal axis wind turbines (HAWTs), it was largely discontinued. Nevertheless, for the built environment, VAWTs have several advantages over HAWTs, namely: low sound emission (due to lower tip speed ratios), better esthetics do the VAWTs' three dimensionality, insensitivity to yaw, and increased performance in skew (see Ferreira S M., van Bussel G., Scarano F., Kuik G., "2D PIV Visulization of Dynamic Stall on a Vertical Axis Wind Turbine", AIAA Paper 2007-1366. 45th AIAA Aerospace Sciences Meeting and Exhibit, 8-11 Jan. 2007, Reno, Nev.).

International Patent Publication WO 2009/053984 discloses the earlier technique of the same inventor relating to a fan or horizontal axis wind turbine comprising at least one blade, and at least one plasma actuator mounted on said blade. This technique provides performance improvements or energy savings for fans used in such applications as personal, industrial and automotive cooling, ventilation, vacuuming and dust removal, inflating, computer component cooling, propulsors for unmanned and manned air vehicles, propulsors for airboats, air-cushion vehicles, airships and model aircraft. Additionally, the invention provides higher performance such as higher lift and higher lift efficiency to small air vehicles. These advantages are achieved by using plasma actuators to provide active flow control effectors into thin blades and wing.

U.S. Pat. No. 7,537,182, of the same inventor, discloses a method of controlling a shear layer for a fluid dynamic body. According to this method, first periodic disturbances are introduced into the fluid medium at a first flow separation location, and simultaneously second periodic disturbances are introduced into the fluid medium at a second flow separation location. A phase difference between the first and second periodic disturbances is adjusted to control the flow separation of the shear layer as the fluid medium moves over the fluid dynamic body.

U.S. Pat. No. 6,267,331, of the same inventor, discloses a method for inhibiting dynamic stall of an airfoil by causing a fluid to flow out of at least one location on the airfoil. This location may be anywhere on the airfoil; but if the location is within one-quarter of the airfoil chord from the leading edge and the fluid flow has non-zero net mass flux, then the fluid flow is modulated at a frequency described by a Strouhal ratio greater than one.

U.S. Pat. No. 4,504,192 discloses an air jet spoiler arrangement for a Darrieus-type vertical axis wind-powered turbine. Air is drawn into hollow turbine blades through air inlets at the ends thereof and is ejected in the form of air jets through small holes or openings provided along the lengths of the blades. The air jets create flow separation at the surfaces of the turbine blades, thereby inducing stall conditions and reducing the output power. A feedback control unit senses the power output of the turbine and controls the amount of air drawn into the air inlets accordingly.

Some problems associated with the flow separation and solutions for reducing the same are described in the following publications of the same inventor: "*The control of flow separation by periodic excitation*", Greenblatt, D. and Wygnanski, I., Progress in Aerospace Sciences, Volume 36, Number 7, October 2000, pp. 487-545(59); "*Effect of leading-edge curvature on separation control: A comparison of two NACA airfoils*", Greenblatt, D. and Wygnanski, I., 40th AIAA Aerospace Sciences Meeting and Exhibit Reno, Nev.", January 2002; "*Effect of leading-edge curvature on airfoil separation control*", Greenblatt, D. and Wygnanski, I., AIAA Journal of Aircraft, Vol. 40, No. 3, 2003, pp. 473-481.

GENERAL DESCRIPTION

There is a need in the art for a novel vertical axis wind turbine (VAWT) characterized by improved performance aimed in particular at reducing dynamic stall of the turbine and thus increasing power production.

The dynamic stall is an important parameter characterizing the turbine performance, and describes a non-linear unsteady aerodynamic effect that occurs when the turbine blade rapidly change the angle of attack. One of the problems confronting the conventional VAWTs is associated with dynamic stall. This is because the presence of dynamic stall phenomenon causes a significant decrease in power and an increase in potentially damaging oscillatory loads. This is a major problem for applications in the built environment where VAWTs are often required to operate at low blade-tip-speed-to-wind-speed ratios (tsr), mainly 3<tsr<4, in order to reduce noise, and hence spend much time in a stalled state.

More specifically, the following should be understood. The flow over blades is called attached when it flows over the surface from the leading edge to the trailing edge of the blade. However, when the angle of attack of the flow exceeds a certain critical angle, the flow does not reach the trailing edge, but leaves the surface at the separation line, beyond which the flow direction is reversed, i.e. it flows from the trailing edge back to the separation line. This is a flow separation condition. During the turbine rotation, a blade converts much less energy from the fluid flow when the flow separates.

Accordingly, flow separation (or dynamic stall) should be reduced as much as possible to improve the efficiency of the turbine. The invention provides a novel VAWT configuration operable to controllably induce an increase of the fluid flow momentum while in the closest vicinity of the leading edge of the blade. The technique of the present invention provides for desirably low dynamic stall, in particular, but not only, when for VAWTs operating at low tsr. The increase of momentum of the fluid flow is created by adding an additional momentum to the flow due to a blowing jet created by the blade. More specifically, the blade is configured with one or more flow affecting units located on at least one side of the blade, preferably substantially at the leading edge of the blade, and controllably operated to selectively induce the blowing jet (i.e. blowing jet creation with a certain time pattern) at said at least one side of the blade, the so-called oscillating or pulsed blowing mode.

It should be noted that a location of the flow affecting unit at the leading edge of the blade is that within a region of the blade substantially not exceeding 20% of the chord's length.

It should also be noted that according to the invention a blowing jet is either a fluid jet, expelled from a slot in the blade's surface; or a plasma jet, induced by an electric field created by electrodes' arrangement on the blade.

It should be understood that a turbine blade has two sides opposite to each other with respect to the blade's chord, defining a space therebetween (which may be hollow or filled with certain media). Considering a blade mounted on a turbine, one of the blade's sides is an inboard side, which is closer to the center of the turbine, and the other is an outboard side. Considering a turbine blade exposed to a fluid flow (e.g. wind), one of the sides of the blade is an upwind-oriented side being the side by which the blade faces the incoming fluid flow, and the other side is a downwind-oriented side. During the turbine rotation in a certain direction and while being exposed to the fluid flowing in a certain flow direction, the inboard side of the blade changes its position with respect to the flow direction thus being selectively either upwind-oriented or downwind-oriented side. As a blade moves along a circular path during the turbine rotation (rotation of the turbine disk), the blade is alternatingly located in an upwind portion (half) of the disk/path with respect to the fluid flow direction and in a downwind portion (half). For the blade location in the upwind half of the disk, its outboard side is upwind oriented (since it faces the incoming fluid flow), while the inboard side of the blade is downwind oriented, and vice versa.

As will be described further below, according to the present invention, the flow affecting unit of the blade is preferably activated (is in its operative position) only when the respective side of the blade carrying said flow affecting unit is downwind oriented. Generally, activation of the flow affecting unit on the downwind-oriented side of the blade can be performed irrespective of whether said blade is located in upwind or downwind half of the turbine. Preferably, however, such downwind-side flow affecting unit is activated when the respective blade is located on the upwind half of the turbine.

Preferably, the blade is associated with a pair of flow affecting units located at opposite sides of the blade (with respect to the blade's axis or chord) and a switching mechanism configured and operable for creating an effect of oscillating blowing from side-to-side. Preferably, the controllable operation of the switching mechanism is actuated upon identifying that an angle of attack satisfies a certain predetermined condition. The desired condition of the angle of attack may be determined by a relation between the angle of attack and a stall angle, or may be determined by a relation between the tsr and a reference tsr value corresponding to the stall condition.

In a preferred embodiment, the flow affecting units are electrical units. For example, each such electrical unit is formed by a pair of electrodes including an electrode screened from the fluid flow and located at the respective side of the blade and an electrode exposed to the fluid flow and located at the leading edge of the blade, where the exposed electrode is common for the two pairs of electrodes. In this case, the switching mechanism utilizes a voltage supply controllably operable with a certain time pattern to selectively activate one of the two electrode pairs, i.e. in an alternating fashion, to create a plasma jet within the fluid flow in the vicinity of the respective side of the blade. In another example, the electrical unit is formed by a flow interacting element, which is shiftable, by an electromagnetic field, between its active position in which it interacts with the fluid flow in the vicinity of the blade and inactive position in which it substantially does not affect/interact with the fluid flow. This may be a vortex generator or piezoelectric element, etc.

In another embodiment, the flow affecting units may be represented by two slots located in the opposite sides of the blade, or vortex generators. Preferably, the slots are symmetrically identical with respect to the blade's chord, each forming a certain acute angle with the chord, e.g. not exceeding or preferably less than 45 degrees. In this embodiment, the switching mechanism may utilize a controllable fluid circulation through the blade between a fluid inlet and the slots by means of a pumping assembly. Alternatively, in this embodiment, the switching mechanism may utilize controllable generation of pressure waves towards the slots.

Generally, the increase in momentum may be implemented over one side of the blade only, i.e. the system may include a single, controllably operable flow affecting unit at one side of the blade. The side over which the momentum increase is implemented is herein defined as the "active side". Such a single fluid flow affecting unit may be in the form of a slot (preferably oriented as described above) or flow interacting element (such as vortex generator or piezoelectric element). In this case, the switching mechanism (hydrodynamic, acoustic, electromagnetic or electro-optical) is controllably operable to activate the flow affecting unit according to orientation of the blade with respect to an incoming fluid flow (i.e. when the active side is downwind oriented) and upon identifying that an angle of attack satisfies a predetermined condition, as described above.

As indicated above, preferably, the flow affecting unit (either in the single-unit embodiment or in the double-unit embodiment) is activated only when the respective side of the blade is downwind oriented with respect to the incoming fluid flow. As indicated above, preferably the flow affecting unit (either in the single-unit embodiment or in the double-unit embodiment) is activated under a certain condition for the angle of attack.

Thus, according to one broad aspect of the invention there is provided control system for controlling operation of a vertical axis wind turbine (VAWT) for generating energy from an incoming fluid flow, the control system comprising at least one flow affecting arrangement associated with at least one blade of the VAWT and a control unit connected to said flow affecting arrangement, the flow affecting arrangement comprising two flow affecting units located in two opposite sides of the blade respectively at a leading edge thereof, each flow affecting unit being operable for creating a blowing jet at the respective side of the blade thereby inducing an increase in a fluid flow momentum, the control unit being configured and operable for selectively activating the flow affecting units in alternating fashion according to a predetermined time pattern to oscillate the blowing jet at the opposite sides of the blade.

The flow affecting arrangement may comprise an electrodes' arrangement defining two pairs of electrodes associated with the opposite sides of the blade. The control unit is configured and operable to selectively activate the electrode pairs to create said blowing jet in the form of a plasma jet in the vicinity of the respective side of the blade. The electrodes' arrangement comprises two electrodes located at the opposite sides of the blade and being screened from the fluid flow and an electrode located at the leading edge of the blade between and spaced-apart from said two electrodes and being exposed to the fluid flow, each of said screened electrodes forming with said exposed electrode a respective one of said two pairs of electrodes.

Preferably, the time pattern is such that at least one of the flow affecting units is active when angle of attack satisfies a predetermined condition. The predetermined condition may define a relation between the angle of attack and a stall angle.

In this case, the control unit operates at least one of the flow affecting units upon identifying that the blade's speed and position in a rotating VAWT correspond to the condition that the angle of attack is larger than the stall angle and terminates said flow affecting unit upon identifying that the angle of attack became smaller than the stall angle.

The flow affecting unit may for example be in the form of a slot made in the respective side of the blade substantially at the leading edge thereof. The control unit operates circulation of a fluid flow through the hollow blade via an inlet made in one of the sides of the blade and the slots. In another example, the control unit comprises an oscillating valve controllably operable for selectively shifting each of the slots between its closed and open positions. In another example, the flow affecting unit is in the form of a vortex generator shiftable between its first and second positions with respect to the respective side of the blade, said vortex generator when in the first position is inoperative with respect to the fluid flow and when in the second position is operative interacting with the fluid flow and inducing increase in the fluid flow momentum.

Preferably, the control system includes a position detector (or blade detector) operable for detecting a speed and position of the blade along a circular path during rotation of the turbine and generating speed data and position data indicative of said blade speed and blade position, respectively; and a flow detector for detecting a speed and direction of the fluid flow, and for generating flow speed data and flow direction data indicative of said flow speed and said flow directions, respectively, with respect to the blade. The control system further includes a processor utility responsive to said blade speed data, said blade position data, said flow speed data, and said flow direction data, for monitoring a condition of the angle of attack, and upon identifying said predetermined condition generating control signal to at least one of the flow affecting units.

According to another broad aspect of the invention, there is provided a control system for controlling operation of a vertical axis wind turbine (VAWT) for generating energy from an incoming fluid flow, the control system comprising at least one flow affecting arrangement associated with at least one blade of the VAWT, and a control unit connected to said flow affecting arrangement, the flow affecting arrangement comprising at least one flow affecting unit located on at least one side of the blade at a leading edge thereof, the flow affecting unit being operable for creating a blowing jet at the respective side of the blade thereby inducing an increase in a fluid flow momentum, the control unit being configured and operable for selectively activate said at least one flow affecting unit according to a predetermined time pattern to oscillate the blowing jet.

As described above, the time pattern is preferably such that said at least one flow affecting unit is active when angle of attack satisfies a predetermined condition. Also, as described above, the predetermined condition may define a relation between the angle of attack and a stall angle. The control unit operates said at least one flow affecting unit upon identifying that the blade's speed and position in a rotating VAWT corresponds to the condition that the angle of attack is larger than the stall angle and terminates said flow affecting unit upon identifying that the angle of attack became smaller than the stall angle.

The time pattern is preferably selected such that said at least one flow affecting unit is activated when the respective side of the blade is downwind oriented with respect to the fluid flow.

The flow affecting unit may be in the form of a slot made in the respective side of the blade substantially at the leading edge thereof, in which case the control unit operates for circulating a fluid flow through the hollow blade via an inlet made in one of the sides of the blade and said slot; or utilizes an oscillating valve controllably operable for selectively shifting the slot between its closed and open positions. The flow affecting unit may alternatively be in the form of a vortex generator shiftable between its first and second positions with respect to the respective side of the blade, said vortex generator when in the first position is inoperative with respect to the fluid flow and when in the second position is operative interacting with the fluid flow and inducing increase in the fluid flow momentum.

According to some embodiments of the present invention, a vertical axis wind turbine (VAWT) is provided for generating energy from an incoming fluid flow, the VAWT comprising at least one blade mounted for rotation along a circular path, and the control system being configured according to the embodiments described above.

According to yet a further aspect of the invention, there is provided a method for controlling operation of a vertical axis wind turbine (VAWT) for generating energy from an incoming fluid flow, wherein said VAWT comprises at least one blade having at least one active side associated with at least one controllable flow affecting arrangement. The method comprises: monitoring a speed and orientation of the incoming fluid; monitoring a speed and orientation of said at least one blade of the rotating VAWT; analyzing data indicative of the speed and orientation of the incoming fluid and data indicative of speed and orientation of said at least one blade, and determining said blade's orientation and an angle of attack relative to said incoming fluid; and selectively operating said at least one controllable flow affecting arrangement for increasing momentum of a first portion of said fluid flowing on said active side, upon identifying that said active side faces the incoming fluid flow and that said angle of attack satisfies a predetermined condition.

BRIEF DESCRIPTION OF THE DRAWINGS

In order to understand the invention and to see how it may be carried out in practice, embodiments will now be described, by way of non-limiting example only, with reference to the accompanying drawings, in which:

FIGS. 7A-7B, 8 and 9 exemplify different configurations of the invention utilizing a pair of flow affecting units formed by vortex generators, each shiftable between its operative and inoperative position with respect to the fluid flow, wherein FIGS. 7a-7b illustrate an embodiment of the present invention, in which the blade includes a vortex generator retractable towards and away of the blade; FIG. 8 illustrates an embodiment of the present invention, in which a vortex generator is deployable by rotation around a hinge; FIG. 9 illustrates an embodiment of the present invention, in which a vortex generator changes its shape via an application of an electromagnetic field;

DETAILED DESCRIPTION OF EMBODIMENTS

Figure 1A:
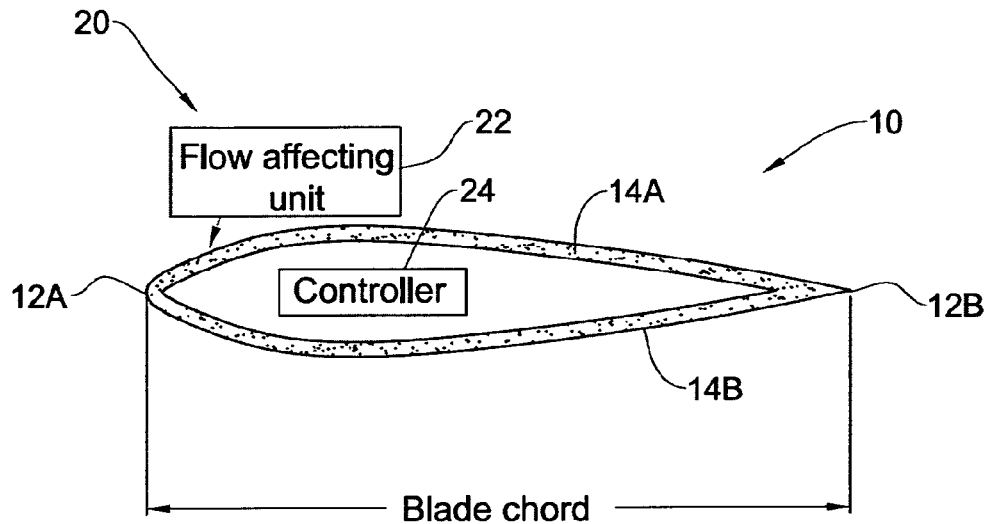
FIGS. 1A and 1B are block diagrams illustrating a control system of the invention to be used with a VAWT, in accordance with two embodiments of the invention, respectively.
Figure 1B:
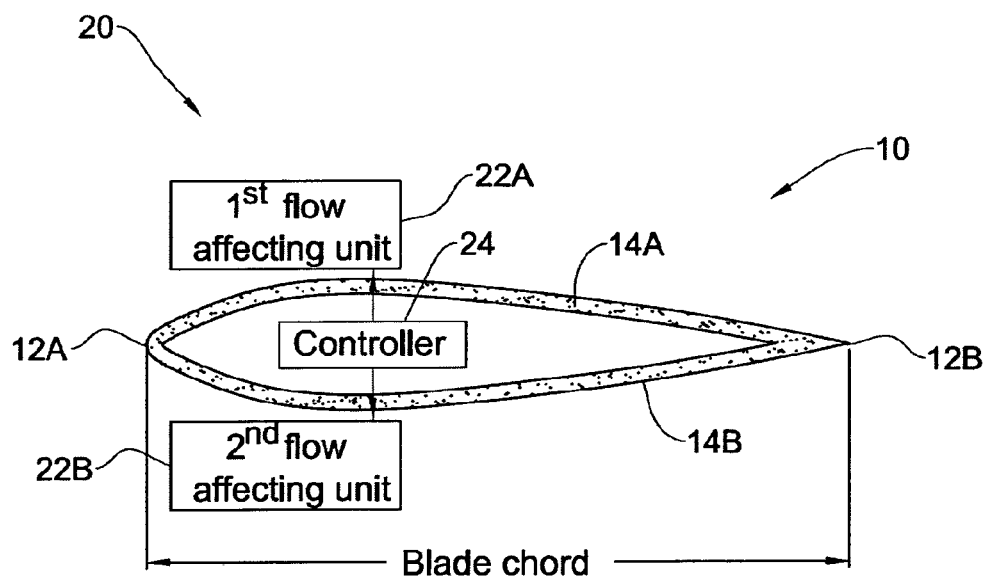

Reference is made to FIGS. 1A and 1B, which illustrate schematically the general principles in configuring a VAWT system in accordance with two embodiments of the invention, respectively. To facilitate understanding the same reference numbers are used for identifying components that are common in all the examples described herein. A typical blade 10 of a VAWT is shown. The blade 10 has a leading edge 12A and a trailing edge 12B defining a blade chord therebetween, and has two opposite sides 14A and 14B defining a plenum chamber. According to the invention, the blade 10 is associated with a flow control system, generally designated 20, for controlling a fluid flow (such as air or water) in the vicinity of the blade 10 to desirably affect the fluid flow by increasing its momentum and thereby reducing the flow separation and thus control the dynamic stall of a VAWT.

The control system 20 comprises a fluid flow affecting arrangement 22 associated with either one or both of the blade sides 14A and 14B, and comprises a controller 24. The fluid flow affecting arrangement 22 is located within a region closer to the leading edge 12A of the turbine blade 10. The controller 24 is configured and operable for implementing a switching mechanism to create a certain time profile of operation of the flow affecting unit resulting in creation of a blowing jet in the vicinity of said flow affecting unit.

In the example of FIG. 1A, flow affecting arrangement 22 comprises a single flow affecting unit located at the leading edge 12A of the blade 10 and operable, by the controller 24. In the example of FIG. 1B, flow affecting arrangement 22 comprises first and second fluid flow affecting units 22A and 22B associated with respectively the blade sides 14A and 14B. The controller 24 implements a switching mechanism to selectively operate one of the flow affecting units 22A and 22B to thereby create oscillating blowing from side-to-side. As shown in this figure, the controller 24 is selectively linked between the flow affecting units 22A and 22B to operate them in an alternating fashion.

Thus, in both examples of FIGS. 1A and 1B, the control of the creation of a blowing jet is applied substantially at the leading edge of the blade, e.g. within a region of the blade chord starting from the leading edge and substantially not exceeding 20% of the chord's length. The control is performed by means of steady or oscillatory perturbations. The perturbations can be internal, external, mechanical, electromechanical, pneumatic, hydraulic, plasma based, Lorentz force based, etc. The oscillatory perturbations may be single- or dual-frequency perturbations.

As will be described further below, the flow affecting unit as well as the controller may have various configurations. For example, each of the first and second flow affecting units 22A and 22B may be formed by a pair of electrodes. Each pair of electrodes includes an electrode exposed to the fluid flow and an electrode screened from the fluid flow, the exposed electrode being common for the two pairs and the screened electrodes being located at the opposite sides 14A and 14B of the blade. In some other examples, the flow affecting unit may be in the form of an aperture or slot made in the respective side of the blade, for example these may be two slots 22A and 22B made in respectively the opposite sides 14A and 14B of the blade; or another element shiftable between its operative position in which it interacts with the fluid flow and an inoperative position.

Figure 2A:
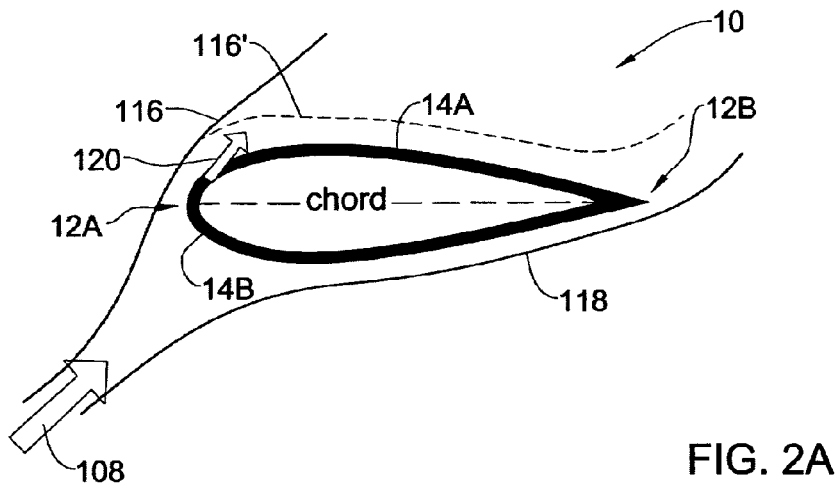
FIGS. 2A-2D illustrate the general principles underlying the present invention associated with a fluid flow around a blade.

Referring to FIGS. 2A to 2D, there are illustrated the main principles underlying the invention. FIG. 2A illustrates the effect of flow separation at the blade. As shown, the blade 10 has a chord extending between its leading and trailing edges 12A and 12B and opposite sides 14A and 14B. The blade is exposed to a fluid flow (wind) with a general flow direction 108. With such position of the blade 10 with respect to the general flow direction 108, the sides 14B and 14A are respectively upwind-oriented (the side of the blade which faces the incoming fluid flow) and downwind-oriented side (the side of the blade which faces away from the incoming fluid flow). The flow streams 116 and 118 are separated at the downwind-oriented side 14A of the blade within a portion thereof substantially at the leading edge of the blade, leaving a low pressure region at said side portion of the blade.

With a conventional configuration of the blade having no flow affecting means, a difference in pressure is created between the upwind-oriented side 14B and the downwind-oriented side 14A, giving rise to dynamic stall, which slows down the movement of the blade 10 and may cause an undesired oscillatory force on the blade 10 therefore decreasing the energy output (power output) of the VAWT. As further shown in the figure, if a momentum 120 is added to the fluid flow when approaching the downwind-oriented side 14A of the blade 10 near the leading edge thereof, so as to increase the fluid flow momentum the fluid stream 116 changes its trajectory to flow along a path 116' extending at least partially along the downwind-oriented side 14A of the blade 10. In this manner, a flow separation is decreased, thereby decreasing dynamic stall along with the undesired effects thereof. The addition of momentum is achieved by appropriately creating a blowing jet at least at said downwind-oriented side of the blade.

Figure 2B:
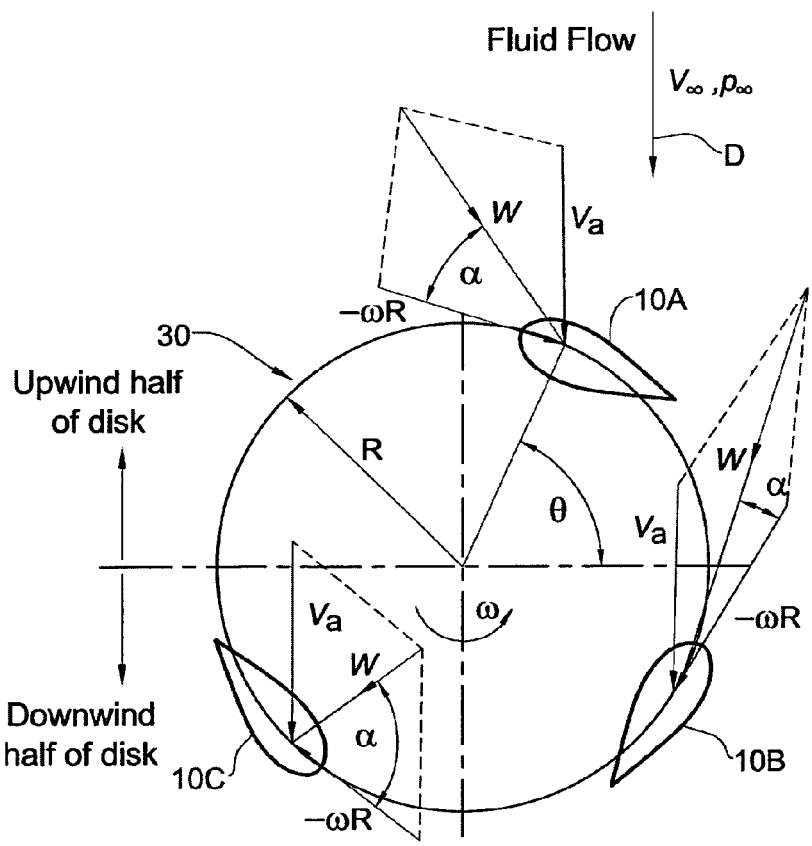

FIG. 2B shows a top view of a three bladed VAWT, generally designated 30, called the turbine disk. The turbine (disk) 30 spins counterclockwise, as shown by arrow ω, and wind (fluid flow) is coming towards the turbine in a direction D flowing with the wind velocity $V_\infty$. During the turbine rotation with angular velocity ω, each of the turbine blades 10A, 10B and 10C is characterized by a respective linear velocity vector, and the wind is characterized by certain speed W relative to the blade. The wind movement acts at an "angle of attack" α relative to the blade chord. The angle θ denotes the angular position of the blade along the disk 30.

During the turbine rotation, when a blade is located in the upwind half of the disk 30, it stalls on the inboard side of the blade, and when the blade is in the downwind half of the disk 30, it stalls on the outboard side of the blade. The control system of the invention is configured and operable to activate each flow affecting unit according to a certain time pattern/profile to increase a momentum of fluid flowing over a portion of the blade by affecting local blade momentum coefficient.

Figure 2C:
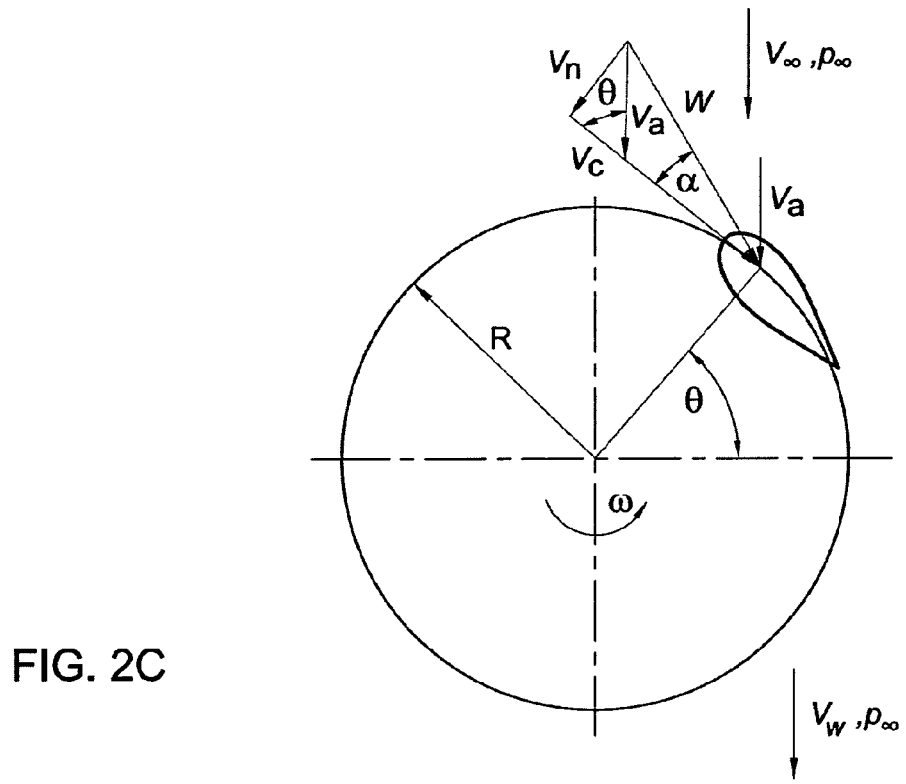
Figure 2D:
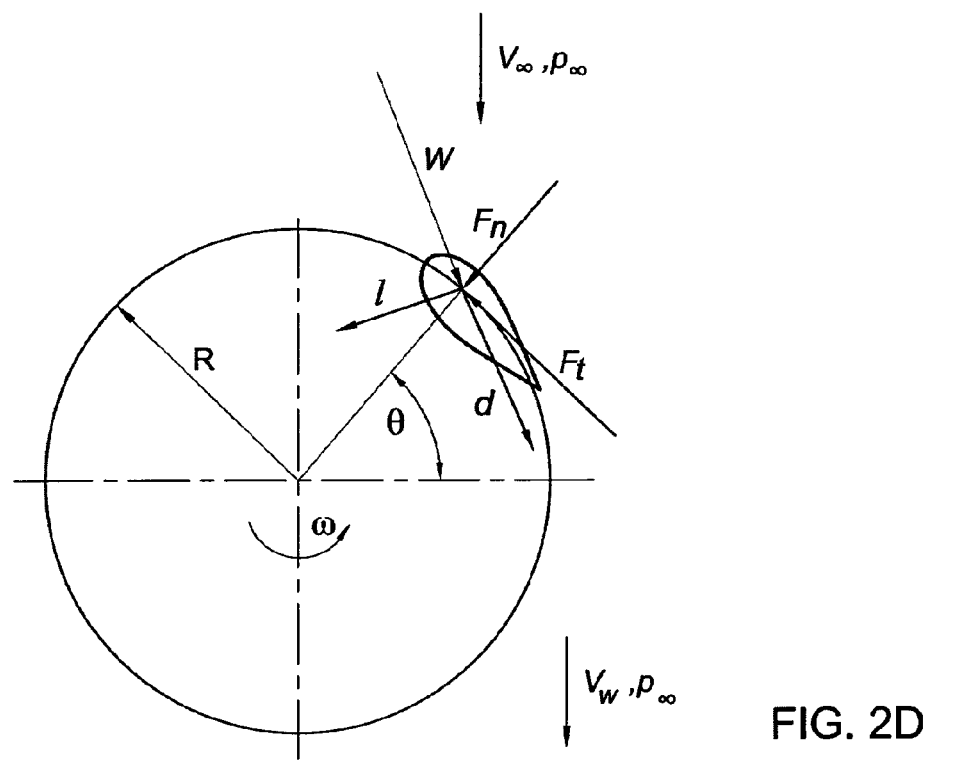

Let us consider the flow velocities of an H-Rotor-type VAWT, subject to a wind velocity $V_\infty$ as shown in FIGS. 2C and 2D. Assuming that the blades' aspect ratio is sufficiently large to neglect induced drag effects, the chordal velocity component $V_c$ and the normal velocity component $V_n$ are, respectively, as follows:

$$V_c = R\omega + V_a \cos\theta \quad (1)$$

$$V_n = V_a \sin\theta \quad (2)$$

where $V_a$ is the axial flow velocity (i.e. induced velocity) through the rotor, ω is the rotational velocity, R is the radius of the turbine, and θ is the azimuth angle. The angle of attack α can be expressed as:

$$\alpha = \tan^{-1}\left[\frac{\sin\theta}{(R\omega/V_\infty)/(V_a/V_\infty) + \cos\theta}\right] \quad (3)$$

where $R\omega/V_\infty$ corresponds to tsr.
The relative flow velocity (W) can be obtained as:

$$W = \sqrt{V_c^2 + V_n^2} \quad (4)$$

Inserting the values of Vc and Vn (equations 1 and 2) in equation 4, one can find the velocity ratio as:

$$\frac{W}{V_\infty} = \frac{W}{V_a} \cdot \frac{V_a}{V_\infty} = \frac{V_a}{V_\infty}\sqrt{\left[\left(\frac{R\omega/V_\infty}{V_a/V_\infty} + \cos\theta\right)\right]^2 + \sin^2\theta} \quad (5)$$

The tangential force coefficient $C_t$ is a difference between the tangential components of lift and drag forces. Similarly, the normal force coefficient $C_n$ is the difference between the normal components of lift and drag forces. The expressions $C_t$ and $C_n$ can be written as:

$$C_t = C_l \sin\alpha - (C_d + C_\mu^*)\cos\alpha \quad (6)$$

$$C_n = C_l \cos\alpha + (C_d + C_\mu^*)\sin\alpha \quad (7)$$

Here $C_l$ and $C_d$ are the two-dimensional lift and drag coefficients:

$$C_t = \frac{l}{\frac{1}{2}\rho W^2 cH} \quad (8)$$

$$C_d = \frac{d}{\frac{1}{2}\rho W^2 cH} \quad (9)$$

where c is the blade chord, H is the rotor height, and ρ is the fluid's density.

Considering the flow affecting unit in the form of a slot on one side of the blade, equations 6 and 7 also contain the local momentum coefficient induced by the blowing jet effect of the slot:

$$C_\mu^* \equiv \frac{J_b}{\frac{1}{2}\rho W^2 A_R} = \frac{\rho A_s U_j^2}{\frac{1}{2}\rho W^2 cH} = \frac{2h_s}{c}\left(\frac{U_j}{W}\right)^2 \quad (10)$$

where $A_s$ is the blowing slot area, $h_s$ is the width of the slot, $U_j$ is the slot blowing velocity, and $A_R$ is the turbine area, i.e., the vertical area of the turbine facing the fluid flow, and defined as $A_R = 2RH$. For the net tangential and normal forces on the blade, we have:

$$F_t = c_t \tfrac{1}{2}\rho cHW^2 \quad (11)$$

$$F_n = c_n \tfrac{1}{2}\rho cHW^2 \quad (12)$$

and the average tangential force is:

$$F_{ia} = \frac{1}{2\pi}\int_0^{2\pi} F_t(\theta)\,d\theta \quad (13)$$

In a similar way, the total drag force on the turbine $F_D$ can be calculated. Based on Rankine-Froude Actuator Disk Theory, we have:

$$V_a = \frac{V_\infty + V_w}{2} \quad (14)$$

where $V_w$ is the wake velocity.

When using a blowing system for active flow control, there is an addition of mass to the disc. This addition of mass affects the conservation equations. Considering the disc of the imaginary body of revolution surrounded by the control volume, non steady blowing $\dot{m}_b(t)$ within the turbine revolution cycle can be calculated. From the mass conservation equation:

$$\frac{\partial}{\partial t}\int_{cv}\rho\,dV + \int_{cs}\rho\bar{u}\cdot\bar{n}\,dA = 0 \quad (15)$$

we can neglect the first term because we are only interested in the mass flow integral of a cycle and it is assumed that the input non-steady blowing $\dot{m}_b(t) = \rho U_j(t) A_s$ does not vary from cycle to cycle. Consequently the mass conservation equation can be written as:

$$-\rho V_\infty A_\infty - \rho \bar{U}_j A_s + \rho V_w A_w = 0 \quad (16)$$

where $\overline{U}_j$ is the mean slot velocity in the cycle. Furthermore, the integral conservation of momentum equation is:

$$-F_{DR} = \frac{\partial}{\partial t}\int_{cv} \overline{u}\rho\, dV + \int_{cs} \overline{u}\rho\overline{u}\cdot\overline{n}\, dA \quad (17)$$

The term $(\rho U_j(t)^2 A_s)$ varies with the azimuthal position $\theta$. Blowing is symmetrically disposed around the disk as it rotates and hence the net contribution to this term is zero. Combining the mass and momentum equations 16 and 17 yields:

$$F_{DR} = \dot{m}(V_\infty - V_w) - \rho V_w \overline{U}_j A_s \quad (18)$$

where $\dot{m} = \rho A_R V_a$ is the rotor area, namely $H\times(2R)$.

The commonly-used interference factor can be defined as:

$$a \equiv 1 - \frac{V_a}{V_\infty} \quad (19)$$

Substituting equation 14 and 19 in 18 and simplifying, gives:

$$a = \frac{C_{DR} + C_{Dj} + \hat{a}^2}{1 + 2C_{Dj}} \quad (20)$$

where $$C_{DR} = F_{DR}/(2\rho A_R V_\infty^2) \quad (21)$$

is the turbine drag force coefficient, and $$C_{Dj} = (h_s/4R)\cdot(\overline{U}_j/V_\infty) \quad (22)$$

is the (non-dimensionalized) contribution of the blowing jet to the momentum equation.

Let us now consider various embodiments for controlling the effect of inducing an increase in the fluid flow momentum. This is an active flow control, which may be introduced via steady or pulsed blowing jet.

The local blade momentum coefficient can be expressed as:

$$C_\mu^* \equiv \frac{J_b}{\frac{1}{2}\rho W^2 cH} = \frac{2h_s}{c}\left(\frac{U_j}{W}\right)^2 \quad (23)$$

and the turbine momentum coefficient can be expressed as:

$$C_\mu = \frac{J_b}{\frac{1}{2}\rho V_\infty^2 cH} = \frac{2h_s}{c}\left(\frac{U_j}{V_\infty}\right)^2 \quad (24)$$

where equations 23 and 24 are related by $$C_\mu^* = C_\mu(V_\infty/W)^2$$

It should be noted that in practical situation the turbine blades are experiencing the relative flow velocity (W) which is varying with the azimuthal position $\eta$ and is a function of induced velocity and tsr. The same is true for the angle of attack $\alpha$ which varies between pre- and post-stalled scenarios. Hence the steady blowing data can be introduced as pulsed and varying momentum, or a so-called pulsed blowing. Alternatively, if $C_\mu$ is kept constant, then the $C_\mu^*$ varies and varying blade data is used. In all instances, the aerodynamic coefficients vary in a quasi-steady manner with varying $C_\mu^*$.

A well-known deficiency of VAWTs is their inability to self-start. A beneficial spin-off of using steady jets for flow control is that the turbine can be self-started under any conditions, including zero wind speed. By controlling the blowing jet behavior (as will be exemplified further below), the turbine having N blades is subjected to a torque:

$$T_p = N\rho A_s U_j^2 R \quad (25)$$

Considering the average tangential force, the power for N blades is:

$$P = NFtR\omega \quad (26)$$

which is commonly non-dimensionalized as the power coefficient $C_p$:

$$C_P = \frac{P}{\frac{1}{2}\rho V_\infty^3 A_R} \quad (27)$$

The angle of attack $\alpha$ changes with the rotation of the blade exposed to a fluid flow, as well as with the change in tsr. When the angle of attach reaches its critical value, known as stall angle $\alpha$stall, maximum lift coefficient is produced. The inventors have found that the turbine efficiency can be significantly improved (i.e. the turbine power can be increased) if the appropriate blowing jet mode is maintained (i.e. the flow affecting procedure is maintained) for a time interval during which the angle of attack satisfies a certain condition with respect to $\alpha$stall or the tsr, i.e. a certain relation between the angle of attack and $\alpha$stall or the tsr exists. For example, the blowing jet mode is initiated when $\alpha \geq \alpha$stall, and is then terminated for $\alpha < \alpha$stall.

Figure 2E:
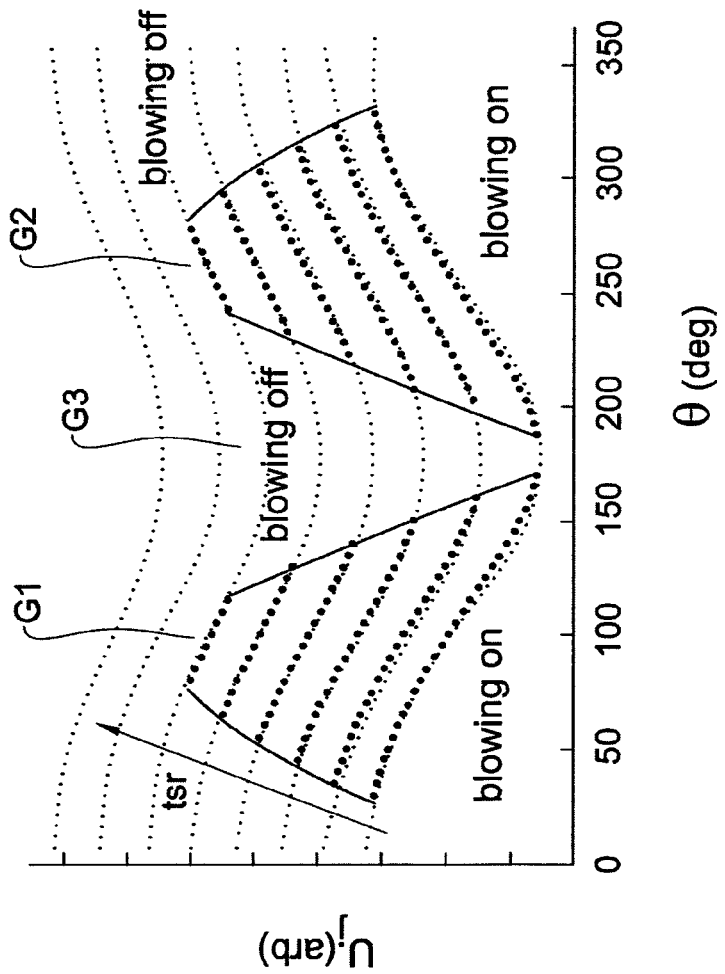
FIG. 2E exemplifies a feature of the invention for implementing selective generation of blowing jet(s)

FIG. 2E shows pulsed blowing jet amplitudes Uj in arbitrary units as a function of azimuthal location $\theta$ and tip speed ratio tsr. Regions G1 and G2 correspond to the azimuthal regions (values of $\theta$ or relative position of the blade during rotation) where the blowing control is active, here $\alpha \geq \alpha$stall. As shown, this leads to pulsed blowing, where the duty cycle, namely the fraction of the cycle that blowing is active, is a function of the azimuthal angle and the tip-speed ratio.

Figure 3A:
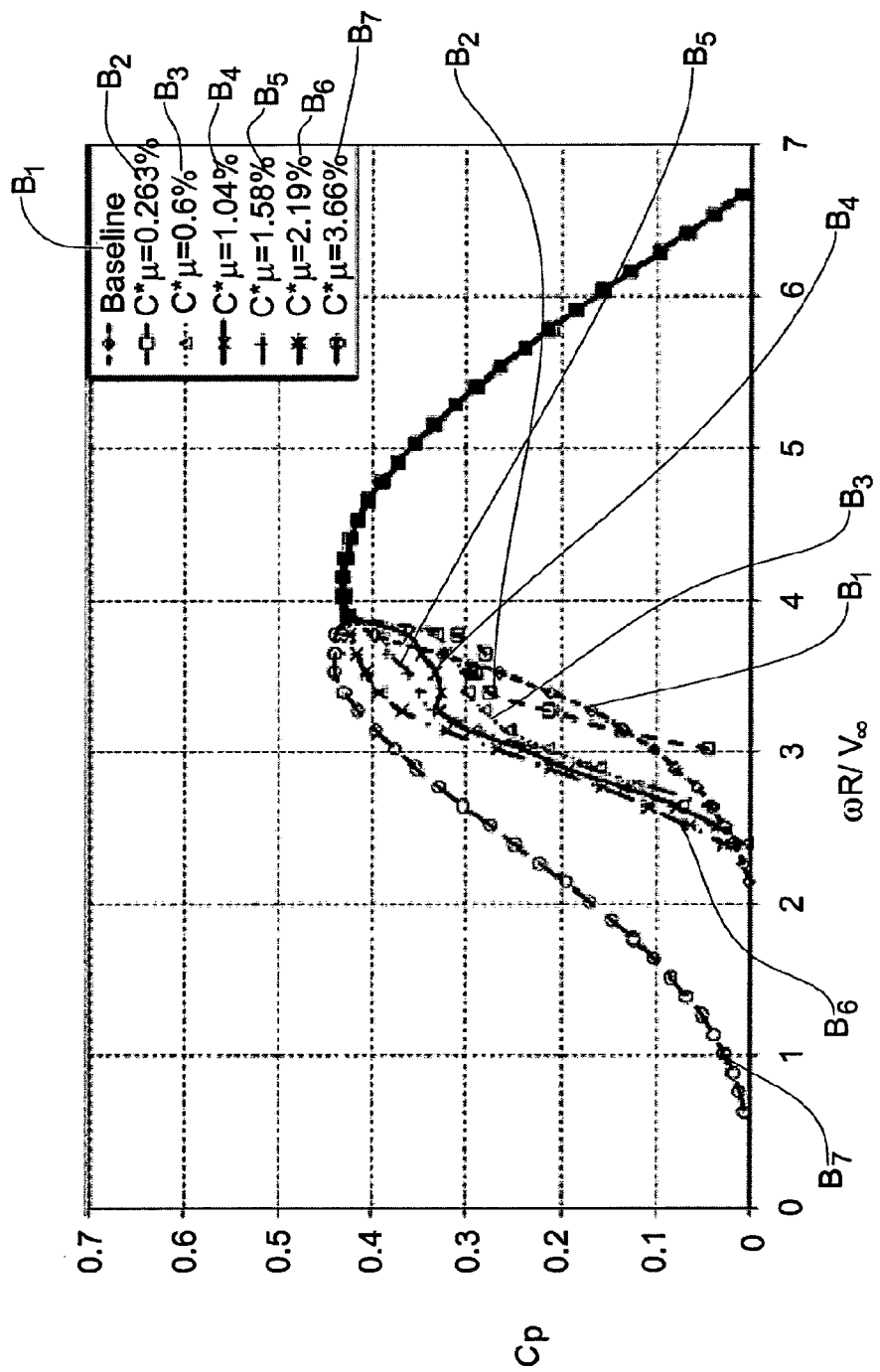
FIGS. 3A and 3B graphically illustrate dependence of the power coefficient on tsr for a given angle of attack (FIG. 3A), and dependence of power coefficient on tsr for different angles of attack.
Figure 3B:
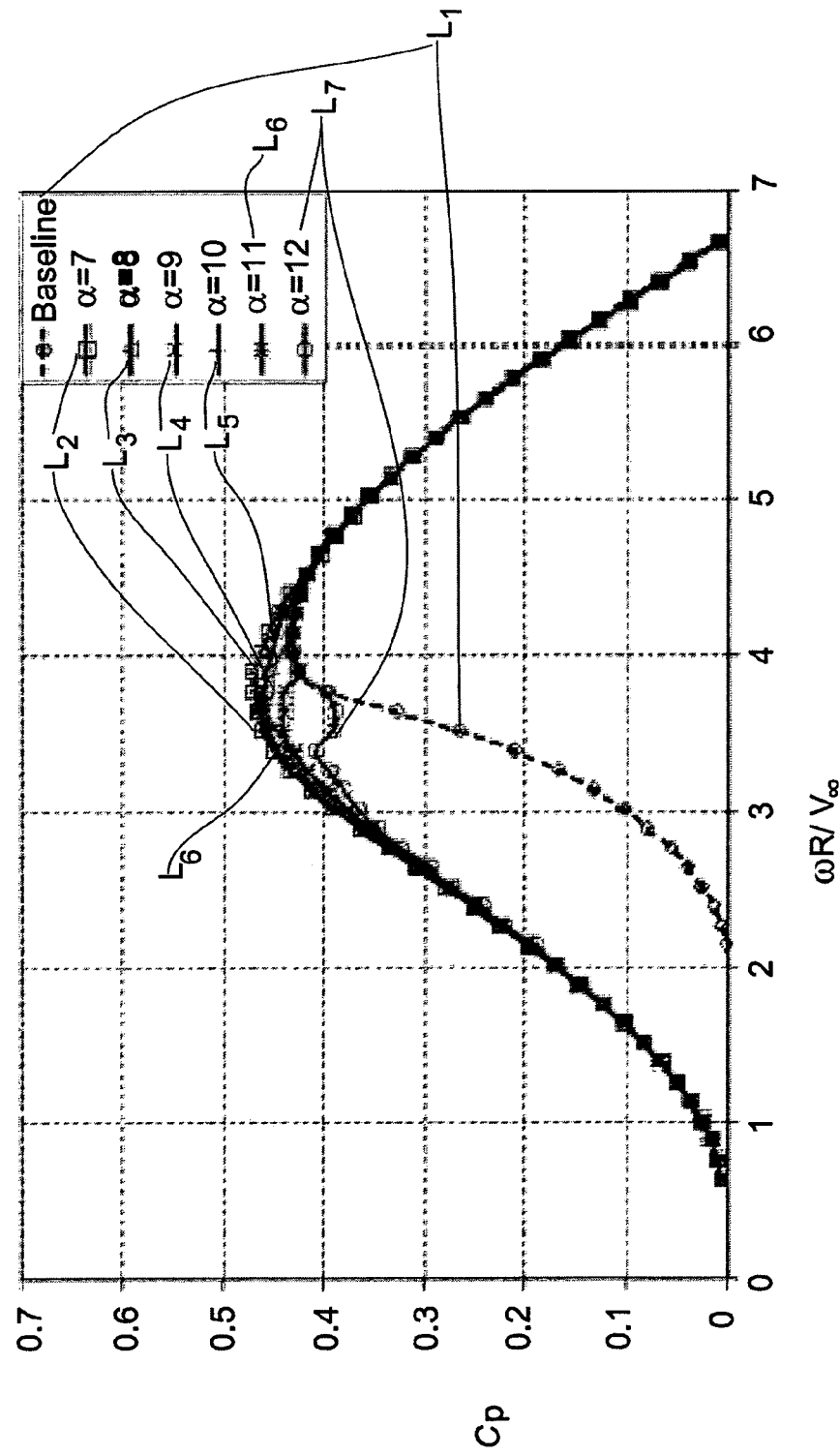

FIGS. 3A and 3B illustrate how the principles of the invention affect the turbine operation. FIG. 3A shows the calculation results (using power correction method) for the effect of pulsed slot blowing at constant momentum coefficient on the net performance of the turbine for $\alpha \geq 11°$. Graphs $B_1$ to $B_7$ correspond to different values of the momentum coefficient. As shown, significant improvements to power output can be seen in the low tsr operating range; furthermore, the peak power output is maintained at a lower tsr values. Operation at the lower tsr values for a given wind speed is known to produce lower noise levels and structural load oscillations. Hence, pulsed blowing provides for effective dynamic stall control of a VAWT.

The angle of attack at which control is initiated/terminated has a significant effect on overall turbine performance. Then inventors have found that even better results in the system performance can be obtained is the blowing jet effect is initiated for an angle of attack of a value somewhat less than $\alpha$stall. This is illustrated in FIG. 3B showing the effect of initiating/terminating the blowing jet for different values of angle of attack $\alpha$ on the system performance for $C_\mu^* = 3.66\%$. Seven graphs are shown L1-L7 for the power coefficient as a function of tsr corresponding to different value of the angle of attack. As can be seen, the optimum results are obtained for angle of 8° which is lower than $\alpha_{stall}=11°$.

Figure 4:
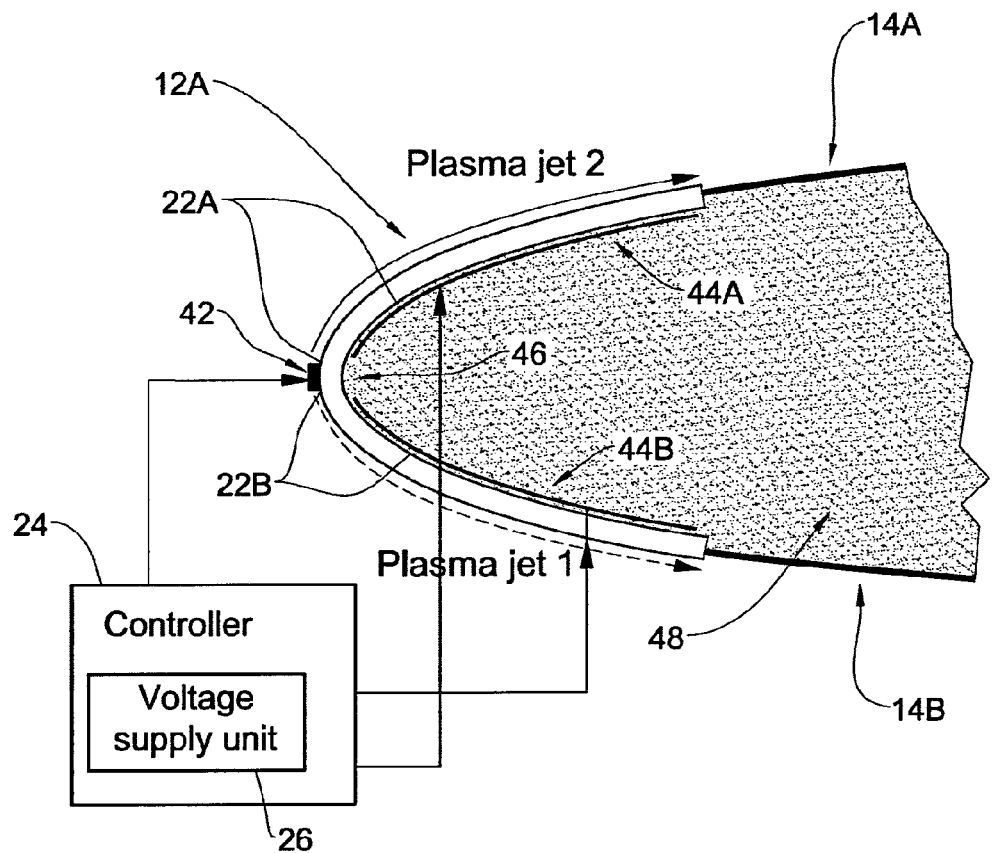
FIG. 4 shows an example of the present invention utilizing a flow affecting arrangement formed by two electrode pairs associated with the two sides of the blade and operable for generating plasma jets at said sides of the blade.

The following are some examples of the VAWT system configuration. FIG. 4 exemplifies the system configured according to an embodiment of the invention utilizing the configuration of FIG. 1B, i.e. two flow affecting units at opposite sides of the blade. Here, the flow affecting arrangement is formed by an electrodes assembly. The figure shows more specifically the leading-edge 12A of the blade associated with the flow effecting elements 22A and 22B of the control system. The flow affecting elements 22A and 22B are presented by an arrangement of electrodes including three electrodes 42, 44A and 44B. Electrodes 44A and 44B are encapsulated electrodes located on inner surface of the blade at its opposite sides 14A and 14B respectively and are thus screened from the surroundings (i.e. from the fluid flow or wind), and electrode 42 is located at outer surface of the blade in between and equally distanced from electrodes 44A and 44B and is exposed to the wind. The electrodes 42, 44A and 44B define together two electrode pairs 42-44A and 42-44B constituting the fluid flow effecting units 22A and 22B respectively. As shown in the figure, the blade has an interior material 48 that ideally is non conductive, such as a plastic, and is provided at the leading edge thereof with a dielectric layer 46 between extending along the electrodes arrangement. A controller 24 includes a voltage supply unit 26 operable for applying voltages to the electrodes. Application of a high voltage (AC) across the exposed electrode 42 and at least one of the encapsulated electrodes 44A and 44B produces a dielectric barrier discharge (DBD) plasma, thus enabling selective creation of Plasma jet 1 and Plasma jet 2 in the vicinity of along the blade sides 14B and 14A respectively. Application of the DBD plasma prevents flow separation and dramatically improves the performance of the turbine (energy conversion).

When a blade is located in the upwind half of the blades' disk, it stalls on the inside of the disk. Under these conditions, the exposed electrode 42 and the encapsulated electrode 44B are activated to produce DBD Plasma jet 1. When the blade (or blades) is in the downwind half of the disk, it stalls on the outside of the disk. Under these conditions, the exposed electrode 42 and the encapsulated electrode 44A are actuated to produce DBD Plasma jet 2. By such cyclic application of the DBD plasma, the stall is significantly reduced resulting in the optimal performance of the turbine.

As indicated above, each of the electrode pairs (i.e. each flow affecting unit) is maintained active during a time interval during which the angle of attack is under a predetermined relation with respect to the stall angle or tsr, for example when the angle of attack is greater than the stall angle. Moreover, preferably the activation of the electrode pair is such that at least one parameter of the plasma jet varies during this time interval, e.g. is oscillating, e.g. pulsing. In this manner, the induced momentum increase of the fluid flow may be kept constant (due to the rotation of the blade).

As described above with reference to FIG. 1A, in some embodiments of the present invention, the momentum increase on the fluid flow is effected only at one side of the blade, i.e. the flow affecting arrangement includes a single flow affecting unit associated with one side of the blade. According to the invention, the momentum increase is activated according to a certain time pattern taking into account the blade's position with respect to the fluid flow, i.e. the increase of the moment is effected only when the respective (active) side of the blade is downwind-oriented with respect to the fluid flow and deactivated when said active side is upwind-oriented. During a time slot when the momentum increase is effected, the added momentum may be constant or varying with time.

The desired increase in the fluid flow momentum is achieved via addition of a momentum caused by creation of a blowing jet due to applied one or more stimuli at the blade. In this connection, it should be noted that, because the stimulus is applied while the blade rotates, then if a constant momentum increase is to be obtained a varying momentum-increasing stimulus is applied, while obtaining a varying momentum increase might require application of a constant momentum-increasing stimulus.

The inventors have found that the decrease in dynamic stall due to the increase in the fluid flow momentum is maximal along the disk 30 when said increase in the fluid flow momentum is effected by the blade located within an angular segment of $0°\leq\theta<90°$ along the circular path or turbine disk 30 (as shown in FIG. 2B). Therefore, in a preferred embodiment, if only one active side is present in the blade or only one side of the blade is active at a given time, said active side of the blade is the inboard side of the blade. This is because during the above-defined section of the disk 30 ($0°\leq\theta\leq90°$), the inboard side of the blade is downwind-oriented, i.e. is the side of the blade along which the separation is to be reduced via an increase in the fluid's momentum.

In some embodiments of the invention, utilizing the system configuration of FIG. 1B, the increase in momentum is effected on both sides of the blade in a generally alternating fashion according to a predetermined time pattern, preferably such that during a time slot when the momentum increase is effected the stimulus is applied via the side that is currently downwind oriented.

Figure 5A:
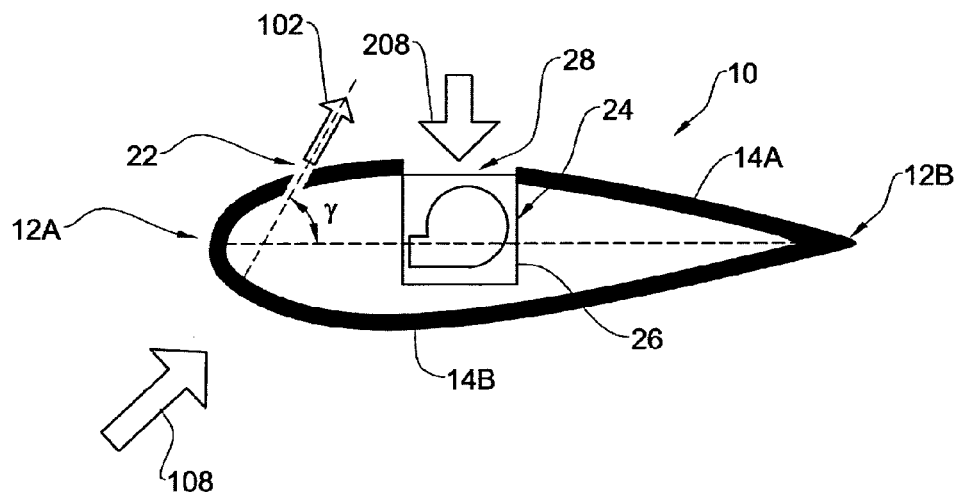
FIG. 5A illustrates an example of the present invention utilizing a flow affecting arrangement formed by a single flow affecting unit in the form of a slot made in the side of a blade and controllably operable to selectively induce creation of the blowing jet.
Figure 5B:
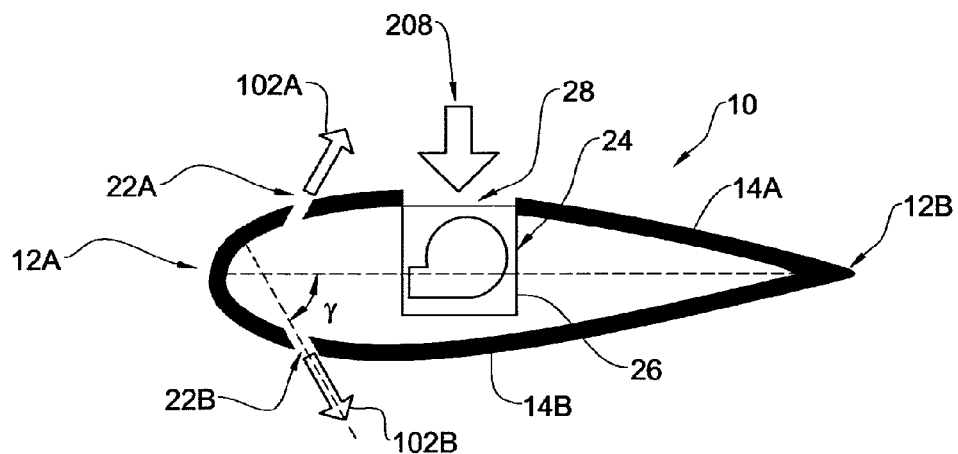
FIG. 5B illustrates an example of the present invention utilizing a flow affecting arrangement formed by two flow affecting unit in the form of two slots made in the opposite sided of a blade and each controllably operable to selectively induce creation of the blowing jet at the respective side.

Reference is made to FIGS. 5A and 5B showing two examples, respectively, of the technique of the present invention for adding momentum to the fluid flow along the blade, utilizing the flow affecting arrangement associated with the single blade side (FIG. 5A) and with the opposite sides of the blade (FIG. 5B). In these examples, the fluid flow affecting unit is in the form of a slot made in the side of the blade at the leading edge thereof, and the controller utilizes a fluid pump circulating fluid through the blade.

In FIG. 5A, a hollow blade 10 is shown, including a slot 22 (constituting a fluid flow affecting unit) on its side 14A in proximity of the blade's leading edge, and a pump 26 (constituting a controller 24). The pump 26 is controllably operated to introduce fluid flow 208 into the hollow section of the blade via an inlet 28. The fluid flows out of the blade via the slot 22, thereby creating a fluid jet 102. Preferably, the slot 22 has a geometry forming a certain acute angle γ with the blade chord such that a component of the fluid jet along a tangent to the blade's surface (at the slot's opening) points from the blade's leading edge to the blade's trailing edge. Preferably, the angle γ is about 45 degrees or less. When the blade side 14A is a downwind-oriented side, momentum of the fluid flowing along the side 14A of the blade 10 is increased. The increase in momentum depends on the velocity of the fluid jet 102, on the angle γ, and on the angle of attack of the blade with respect to the incoming fluid flow. The velocity of the fluid jet 102 may be constant or variable.

The increase in momentum at the blade side 14A is most effective for decreasing flow separation when the blade side 14A is downwind-oriented with respect to the general fluid flow direction (i.e. faces away from the fluid flow 108). Therefore, according to a preferred embodiment, the pump 26 is turned off or operated at decreased power when the blade side 14A is upwind-oriented, and is turned on or operated at increased power when the blade side 14A is downwind-oriented.

In FIG. 5B, a blade 10 is shown having first and second blade slots 22A and 22B (constituting first and second flow affecting units) made in the blade sides 14A and 14B. The slots 22A and 22B preferably have symmetrically identical geometries (with respect to the blade central axis or chord) thus forming opposite angles with the blade chord, e.g. 45 and 135 degrees. The fluid expelled by the pump 26 is divided into the first fluid jet 102A passing through the first slot 22A and a second fluid jet 102B passing through the second slot 22B. The velocities of the two fluid jets depend on the geometries (length, width, depth) of the slots and on the orientations of the slots. For the symmetrically identical geometry of the slots 22A and 22B and thus substantially opposite angles, the fluid jets 102A and 102B are about equal. The pump 26 may operate continuously thereby producing continuous jets 102A and 102B, in order to ensure that momentum increase is always effected on the downwind side of the blade by the downwind fluid jet. The power at which the pump 26 operates (and therefore the velocities of the jets) may be constant or may vary according to the position and/or speed of the blade during rotation of the turbine. If the power at which the pump 26 operates is constant, the effected increase in momentum varies with the position of the blade 10. Conversely, if the pump 26 operates in a pulsed manner, the effected increase in momentum may be kept constant. In any case, the local blade momentum coefficient and the turbine momentum coefficient are affected via induced slot blowing velocity.

As described above, the control system 20 utilizing two-unit flow affecting arrangement 22 is preferably configured and operable to implement a switching mechanism that moves the jet blowing from side-to-side in an oscillatory manner. This can be implemented using a flow affecting unit configured and operable to be shiftable between its operative position when it effects interaction with the fluid flow outside the blade and an inoperative position thereof in which there is no such interaction. Such shifting is performed according to a certain time pattern. Generally, the time pattern is such that the two flow affecting units are maintained active in an alternating fashion each during a certain time interval. As indicated above, the time interval during which the flow affecting unit is active preferably starts and ends according to a predetermined condition of the angle of attack. The latter is monitored by the control system based on the velocity of the fluid flow and the rotational speed of the turbine. During the time interval when the flow affective unit is active, it produces a blowing jet, which may be oscillatory blowing, e.g. in a pulsed mode. The oscillation of the blowing jet generally means that at least parameter of the jet varies in time during said time interval, this may be varying amplitude and/or frequency.

The following are several specific but not limiting examples of such system configuration.

Figure 6A:
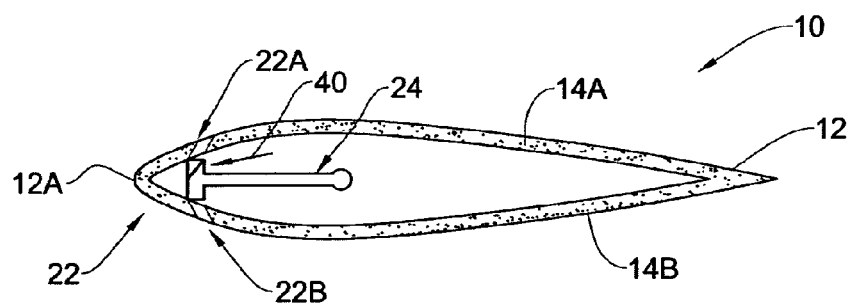
FIGS. 6A to 6C illustrate three examples of the invention, respectively, utilizing a flow affecting arrangement formed by two flow affecting unit in the form of two slots made in the opposite sided of a blade and operable by oscillating valve.
Figure 6B:
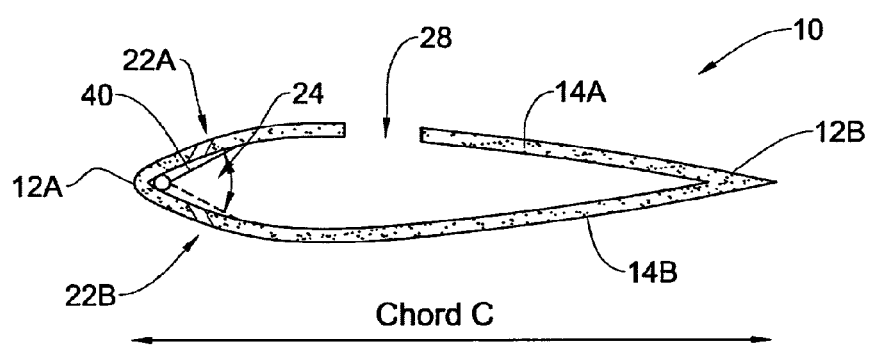
Figure 6C:
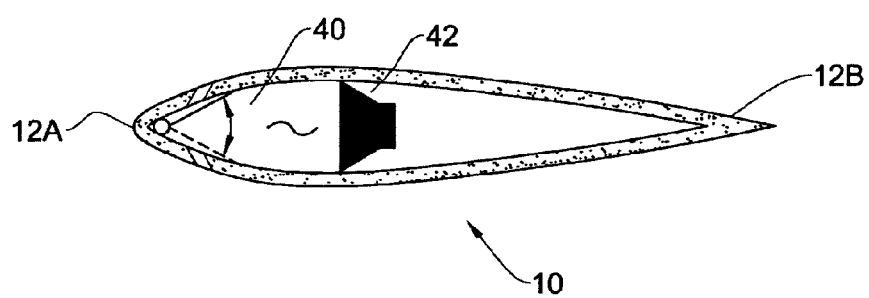

FIGS. 6A to 6C illustrate a blade 10 having leading and trailing edges 12A and 12B and two sides 14A and 14B, and a control system 20 including a flow affecting arrangement 22 and a controller 24. The flow affecting arrangement is located at the leading edge 12A of the blade and includes two slots 22A and 22B arranged in the symmetrically identical fashion in the two sides 14A and 14B respectively. The controller 24 includes a valve 40 operable in oscillating mode by a control system (not shown) for selectively opening and closing one of the slots 22A and 22B according to a predetermined time pattern. As exemplified in FIG. 6A, the valve may be mechanical or hydraulic, etc.

As shown in FIG. 6B, the valve is oscillating between its first position when it closes the slot 22A while keeps the slot 22B open, and its second position in which it opens the slot 22A and closes the slot 22B. In this example, the blade has an inlet opening 28, made in either side of the blade, in side 14A in the present example. The operation of the valve 40 performs circulation of fluid through the blade between its inlet 28 and one of the outlet slots 22A or 22B.

In the example of FIG. 6C, the blade has no inlet opening and shifting of the valve 40 between its first and second positions is implemented using a controllably operated pressure wave generator 42. The latter operates in an appropriate oscillating mode, and may be of any suitable known type, such as acoustic driver, piezo-electric or ceramic oscillator, etc. The operation of the pressure wave generator 42 is a zero net mass-flux operation.

Figure 7A:
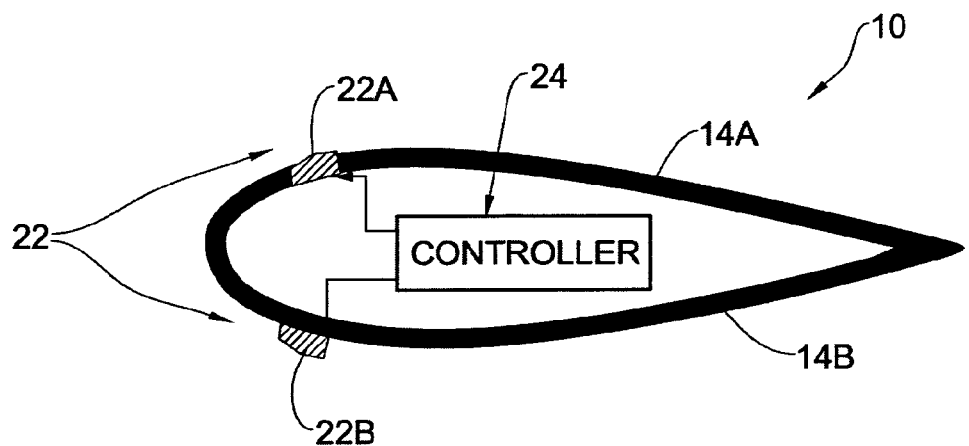
Figure 7B:
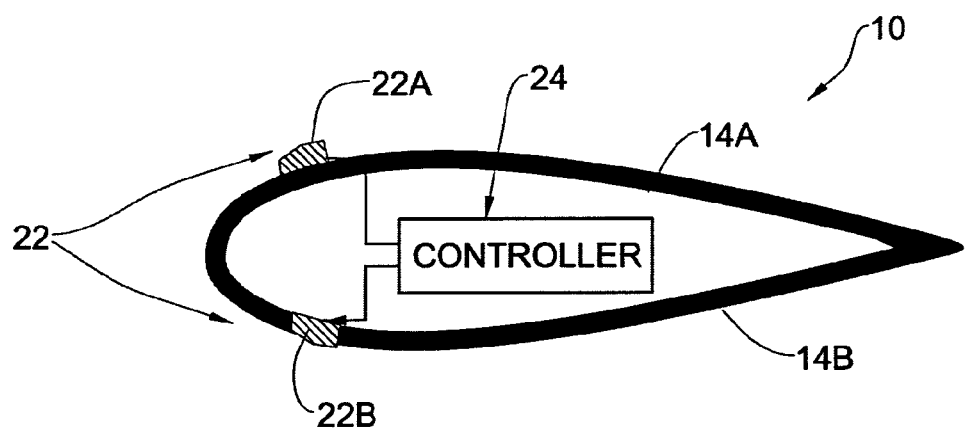

FIGS. 7A-7B exemplify a blade 10 carrying a flow-affecting arrangement 22 associated with an appropriate controller 24. Here, the flow affecting arrangement 22 is formed by two vortex generators 22A and 22B located on the blade sides 14A and 14B of the blade. Each vortex generator is shiftable between its inoperative retracted position at which it substantially does not interact with fluid flow in the meaning that it substantially does not affect the fluid flow momentum, and its operative projected position in which it interacts with the fluid flow. In a variant, the vortex generator may have one or more intermediate positions: the vortex generator may be controllable to partially project from the blade, thereby creating a weaker or stronger vortex, according to the VAWT's requirement. In a variant, the strength of the vortex varies with the position of the blade along the circular path during the turbine rotation. As shown in the figures in self-explanatory manner, controller 24 is selectively linked between the vortex generators 22A and 22B to shift one of them into from its inoperative position to the active position, in which it interacts with/affects the fluid flow.

Figure 8:
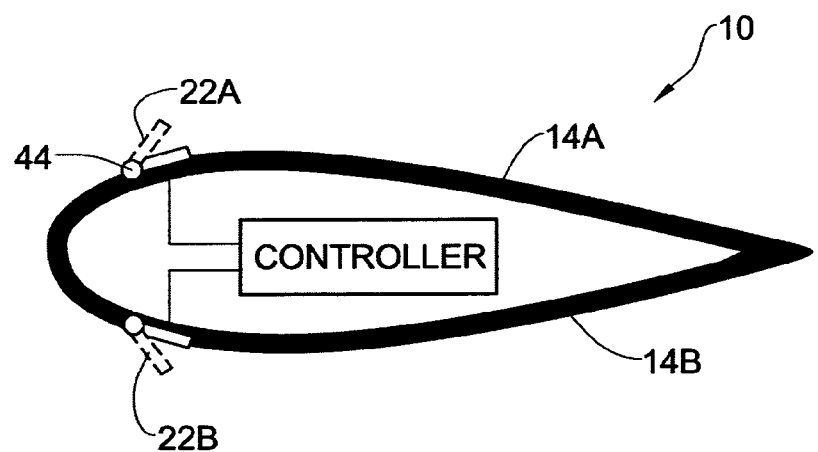

FIG. 8 illustrates an example of the flow affecting arrangement 22 in which a flow affecting unit includes a vortex generator 22A, 22B deployable by rotation around a hinge 44. When the vortex generator is in an undeployed mode, it extends along the blade to cover a portion of the blade, and when the vortex generator is in a deployed mode, it projects from the blade, via rotation about hinge 44, and interacts with the fluid flow thereby affecting its momentum. Optionally, the vortex generator has one or more intermediate modes, forming different angles with respect to the blade's surface.

Figure 9:
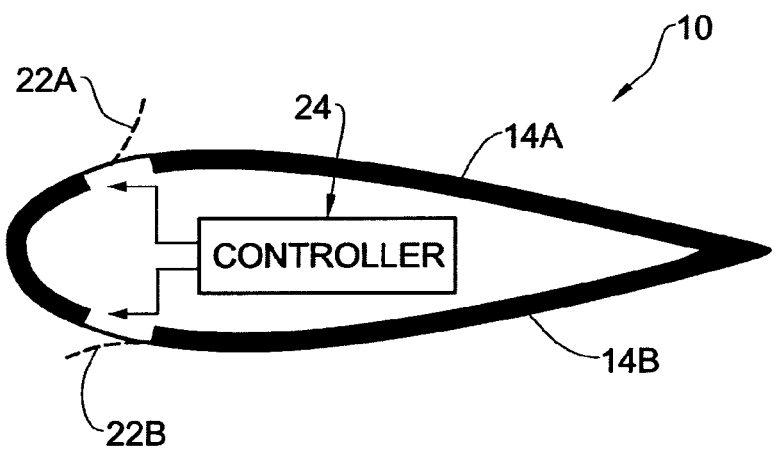

FIG. 9 illustrates a somewhat different example, in which a vortex generator is operable for changing its shape in response to application of a certain field. The applied field may be an electromagnetic field causing the shape change of the vortex generator via a current and/or a voltage and/or a magnetic field, applied either by contact or in a contactless manner. A suitable material for such a vortex generator may be, for example piezoceramic, a magnetostrictive material, or a magnetic shape memory alloy (a material that changes shape under the influence of a magnetic field). The applied field may be a temperature field, and a suitable material for such a vortex generator may include a shape memory alloy that changes shape when temperature changes.

Figure 10:
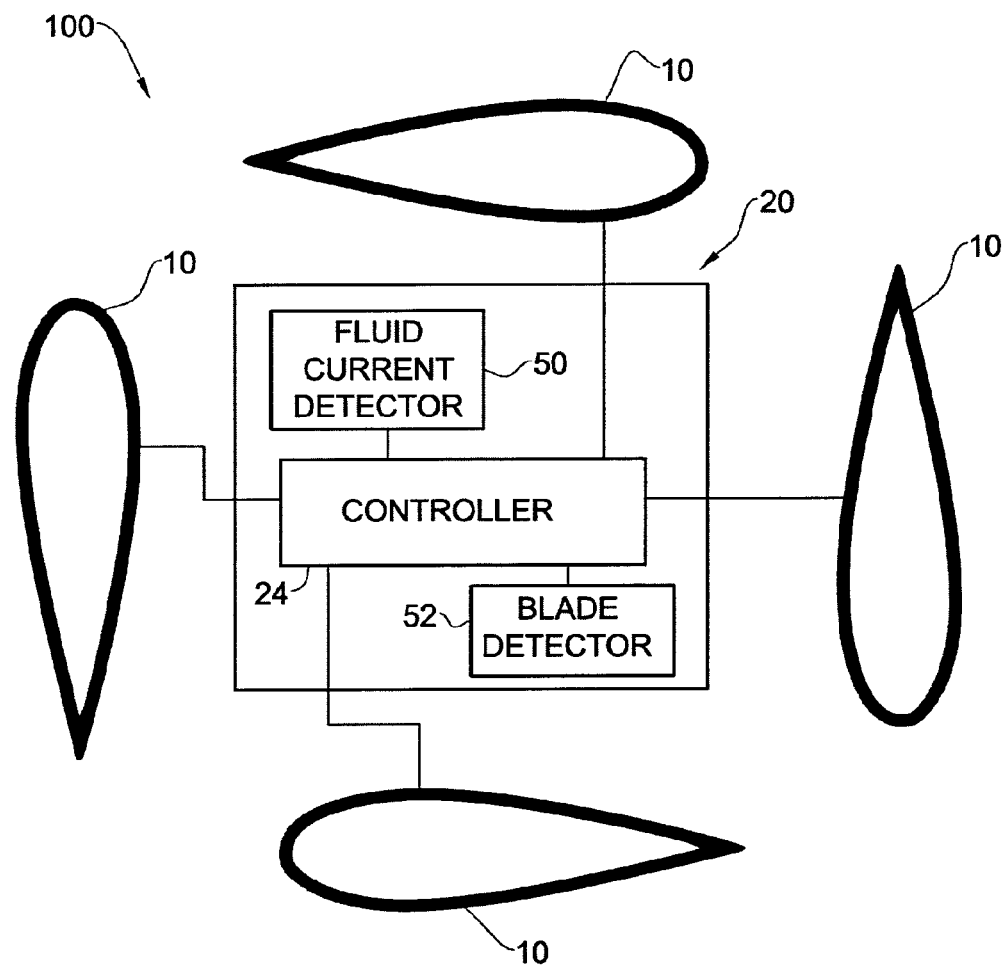
FIG. 10 is a schematic drawing exemplifying a VAWT system of the present invention for controlling selective blowing jet generation at the VAWT's blades.

FIG. 10 is a schematic illustration of a VAWT 100 of the present invention having a control system associated with a turbine and configured and operable for controlling blowing jet generation by least one blade of the turbine according to the direction of a fluid current and the blade's position. The VAWT 100 includes one or more blades, generally at 10. Each blade 10 is equipped with the control system 20 designed and operable as described above for increasing the momentum of fluid flowing along at least one of the blade's sides. The side along which the flow's momentum is increasable is herein defined as the active side of the blade. Each blade may have one or two active sides, as described above. The control system associated with the blade's side or sides may be configured as any of the above-described not limiting examples. The control system 20 is associated with the flow affecting arrangement (not shown) at the blade (e.g. at each blade), and includes a blade detector 52 and a fluid flow detector 50. The blade detector 52 is designed for detecting the blade's position along the circular path and the blade's speed, and for generating data indicative thereof. The fluid flow detector 50 is designed for detecting the general direction of the incoming fluid and the speed of the incoming fluid, and for generating data indicative thereof. The data generated by the blade detector 52 and the fluid flow detector 50 is received by the controller 24, which has a suitable processor utility operable for determining the orientation of each blade with respect to the direction of the incoming fluid flow and thereby determines the angle of attack. The controller 24 is designed for activating said momentum increase at the blade according to a certain time pattern, as described above, based on the orientation of each blade with respect to the direction of the incoming fluid flow and to the angle of attack.

The control system 20 ensures that for each blade fluid flow momentum over the active blade side is increased at least when the active blade side is downwind oriented. The control system may operate to switch the momentum-increasing element on and off, according to an orientation of each blade and in accordance with the angle of attack. The time pattern may be such that the flow affecting unit is operative during time intervals when the blade side carrying said flow affecting unit is downwind oriented and preferably also said blade is within the upwind half of the rotating turbine; and in either one of these options the time pattern preferably also takes into account an angle of attack.

Figure 11:
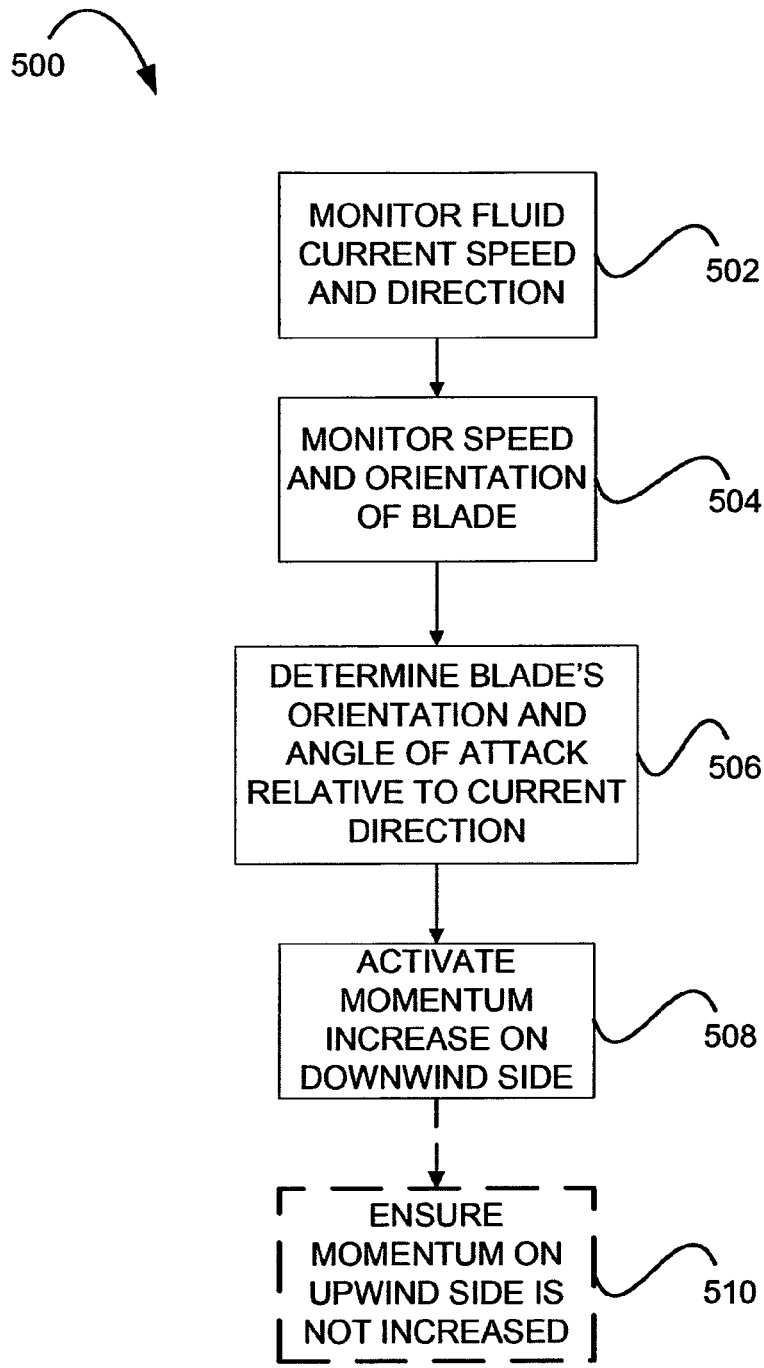
FIG. 11 is a flowchart illustrating an example of a method of the present invention for decreasing dynamic stall of a VAWT blade.

FIG. 11 illustrates a flowchart 500 of a method according to an example of the present invention for decreasing dynamic stall of a VAWT system. At 502, a direction and speed of a fluid current is monitored. At 504, the speed and orientation of the blade is monitored. The orientation may be determined, for example, by monitoring the position of the blade along a known path of the blade. The monitoring of steps 502 and 504 may be continuous or effected at a predetermined frequency. At 506, the fluid current's speed and direction and the blade's speed and orientation are used to determine an orientation of the blade relative to the direction of said fluid current and the angle of attack and a relation/condition of the angle of attack with respect to the stall angle or tsr. At 508, the momentum of the fluid flow along at least a downwind blade side is increased, during a time interval corresponding to the predetermined condition of the angle of attack. The momentum increase may be constant in time or varying, e.g. may depend on the blade's orientation relative to the fluid flow's direction. Optionally, at 510, a check is performed to ensure that the momentum increase is not effected on fluid flowing over an upwind-oriented side of the blade. This is accomplished by controlling operation of the two active sides to ensure that when the flow affecting arrangement on one of the active sides is operative, the flow affecting arrangement on the opposite side is inoperative. This last step may be used as an energy-conserving step, as the fluid naturally flows along the blade's upwind-oriented side. If the blade only has only one active side, the step 510 may be performed by turning off the momentum-increasing element when the blade's active side is the upwind-oriented side. If both sides of the blade are active sides, then the step 510 may be performed by controlling a switching unit, so that all the energy of the momentum-increasing element is focused on increasing the flowing flow's momentum on the blade's downwind-oriented side and none of the energy of the momentum-increasing element is used to effect a momentum increase on the blade's upwind-oriented side.

EXAMPLES

Reference is now made to the following examples, which together with the above descriptions illustrate some embodiments of the invention in a non limiting fashion. The following are some computations based on experimental data carried out by the inventors to compare power generated by a blade in a VAWT of the present invention with a power generated by a typical VAWT blade which does not impart any momentum to air flowing thereon.

Experiments were performed of a NACA0012 airfoil with an 9-inch chord (c) and 24-inch span (203 mm×610 mm) that was equipped with fifty surface pressure ports and a two-dimensional leading edge active flow control slot of width $h_s$=0.6 mm. Sections of the airfoil's ribbing were removed to render an essentially hollow interior which served as a plenum chamber. A roughness strip (Grit #100), used to trip the boundary layer, was fixed to the leading edge and extended to 4% chord on both top and bottom surfaces. Surface pressure data was augmented by hot wire measurements in the upper surface boundary layer and surface mounted tufts were used for rudimentary flow visualization. The airfoil was therefore a single-slot airfoil, as illustrated in FIG. 3a.

Tests were conducted in a 610 mm×1500 mm test section wind tunnel. Surface measurements were made by means of a P54000® array of pressure transducers (AA Lab Systems). Total drag measurements were made using a rake of total head probes at approximately four chord-lengths downstream of the trailing edge. The Reynolds number range that was considered in the study was 100,000≤Re≤480,000.

The airfoil was mounted in a low speed ($U_\infty$<75 m/s), low-turbulence, closed-loop wind tunnel. Two flanged and angled tubing segments were bolted to both sides of the airfoil corresponding to the ¼ chord position. The tubing segments were mounted on bearings outside the wind tunnel and served the dual purpose of facilitating airfoil pitching and introducing steady blowing into the airfoil plenum. Boundary layer control was implemented by means of steady slot blowing. To achieve this, one flanged segment was connected to a 50 kPa blower where the flowrate Q and temperature T were measured by means of a rotameter and thermocouple, respectively. The slot jet velocity ($U_j$) was calculated via elementary conservation of mass. Sample lift and drag coefficients were measured calculated for different momentum coefficients [$C_\mu$ (wind tunnel)] and for different angles of attack, where $$C_\mu(\text{wind tunnel}) = (h_s/c)(U_j/U_\infty)^2$$

The momentum coefficient is indicative of the momentum added to the fluid flowing along a side of the blade. The measured lift and drag coefficients were used in turbine analysis for calculating the power coefficient ($C_P$) of the turbine, which indicates the power output of the turbine.

In turbine analysis, the blade's local momentum coefficient ($C^*_\mu$) is defined as:

$$C_\mu = (h_s/c)(U_j/V_\infty)^2$$

where W is the relative flow velocity, which depends on the wind velocity and on the blade's angle of attack. The turbine's momentum coefficient ($C_\mu$) is:

$$C_\mu = (h_s/c)(U_j/V_\infty)^2$$

where $V_\infty$ is the wind velocity. Blade-tip-speed-to-wind-speed ratio (tsr) is defined as:

$$tsr=\omega R/V_\infty$$

where $\omega$ is the rotational velocity of the blade in a VAWT, and R is radius of the VAWT (i.e. the distance of the blade from the center of the VAWT).

Two ways of adding momentum have been analyzed: (i) keeping $C^*_\mu$ constant, and (ii) keeping $C_\mu$ constant. By keeping $C^*_\mu$ constant, the jet's velocity ($U_j$) is to be changed according to the blade's position, and constant momentum is imparted to the fluid flow. This is called pulsed blowing. Conversely, by keeping $C_\mu$ constant, the jet's velocity is kept constant, but the momentum imparted to the fluid flow changes with the position of the blade.

Figure 12:
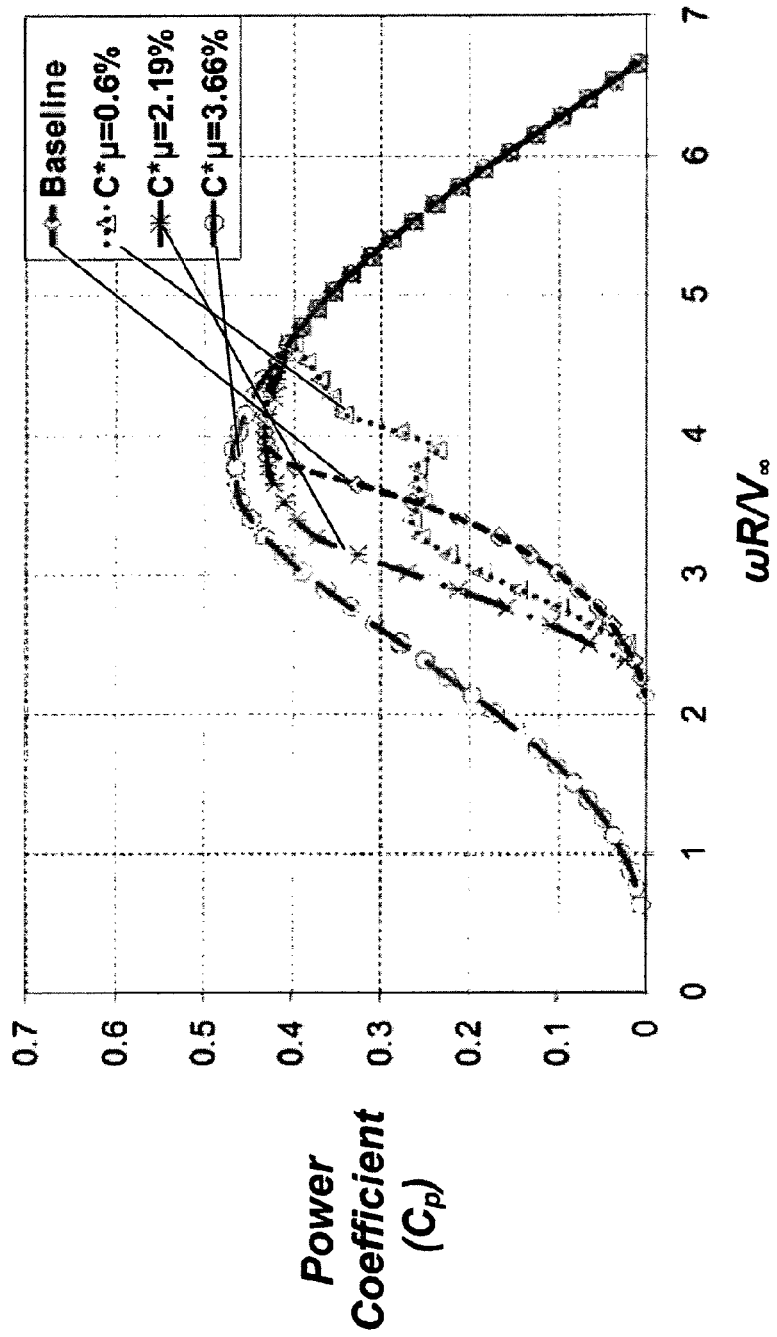
FIG. 12 is a graphical representation of different power vs tsr curves, each curve corresponding to a constant momentum imparted to air flowing around the two-slot blade.

FIG. 12 is a graphical representation of different power vs tsr curves, each curve corresponding to a constant momentum imparted to air flowing around the blade by a blade according to FIG. 6B. The results of the experimental data were introduced into a turbine analysis model in order to calculate the power coefficient of a VAWT, in which pulsed blowing is effected ($U_j$ is varied) to keep the momentum increase constant over the downwind-oriented side of the blade. For the calculation, it was theorized that the valve was operated to prevent a jet from exiting via the upwind-oriented slot. It is shown that when a jet through the slot is higher than zero, and the momentum coefficient is kept constant, the resulting power coefficients for the VAWT are higher than the power coefficient provided by the baseline condition at low tsr. At high tsr, the calculated power coefficients correspond to the baseline power coefficient. The term "baseline" refers to the condition of no blowing—and therefore no fluid jet through the slot.

Figure 13:
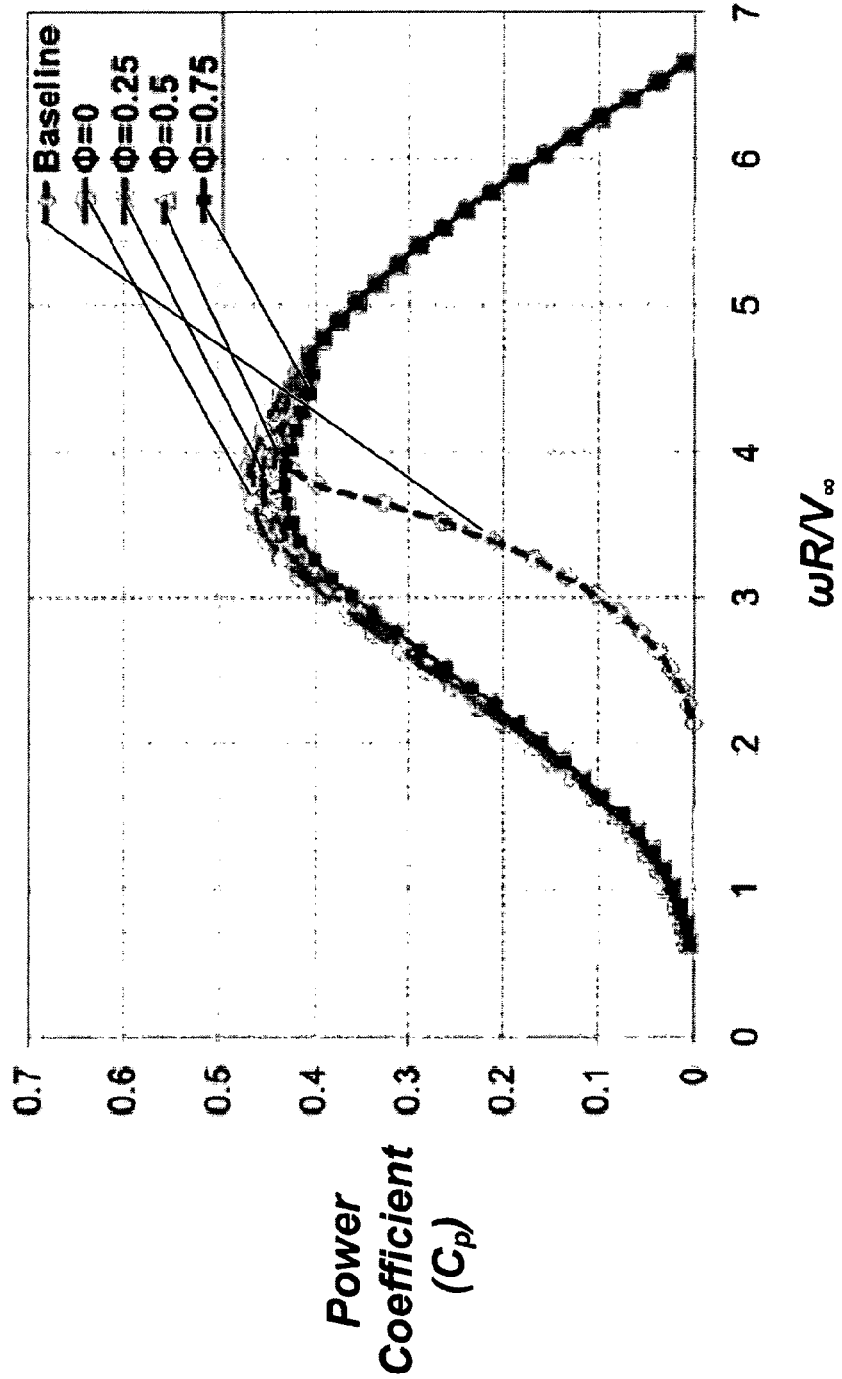
FIG. 13 is a graphical representation of different power vs tsr curves when momentum is imparted to air flowing around a two-slot blade, each curve corresponding to a different system power loss.

FIG. 13 is a graphical representation of different power vs tsr curves when constant momentum is imparted to air flowing around the blade, each curve corresponding to a different system power loss. In order to calculate the power coefficients, a system loss factor $\Phi$ was introduced. What is illustrated in FIG. 13 is that even when the system loss factor $\Phi$ was 0.75 (75%), at low tsr, the power coefficient provided by a VAWT with a double-slotted blade generating a pulsed jet is higher than the baseline power coefficient. Typically, a better system design is that of a relatively low $\Phi$. The factor $\Phi$ depends solely on the design concept. As a general rule, an aim of turbine design is to keep $\Phi \ll 1$.

Figure 14:
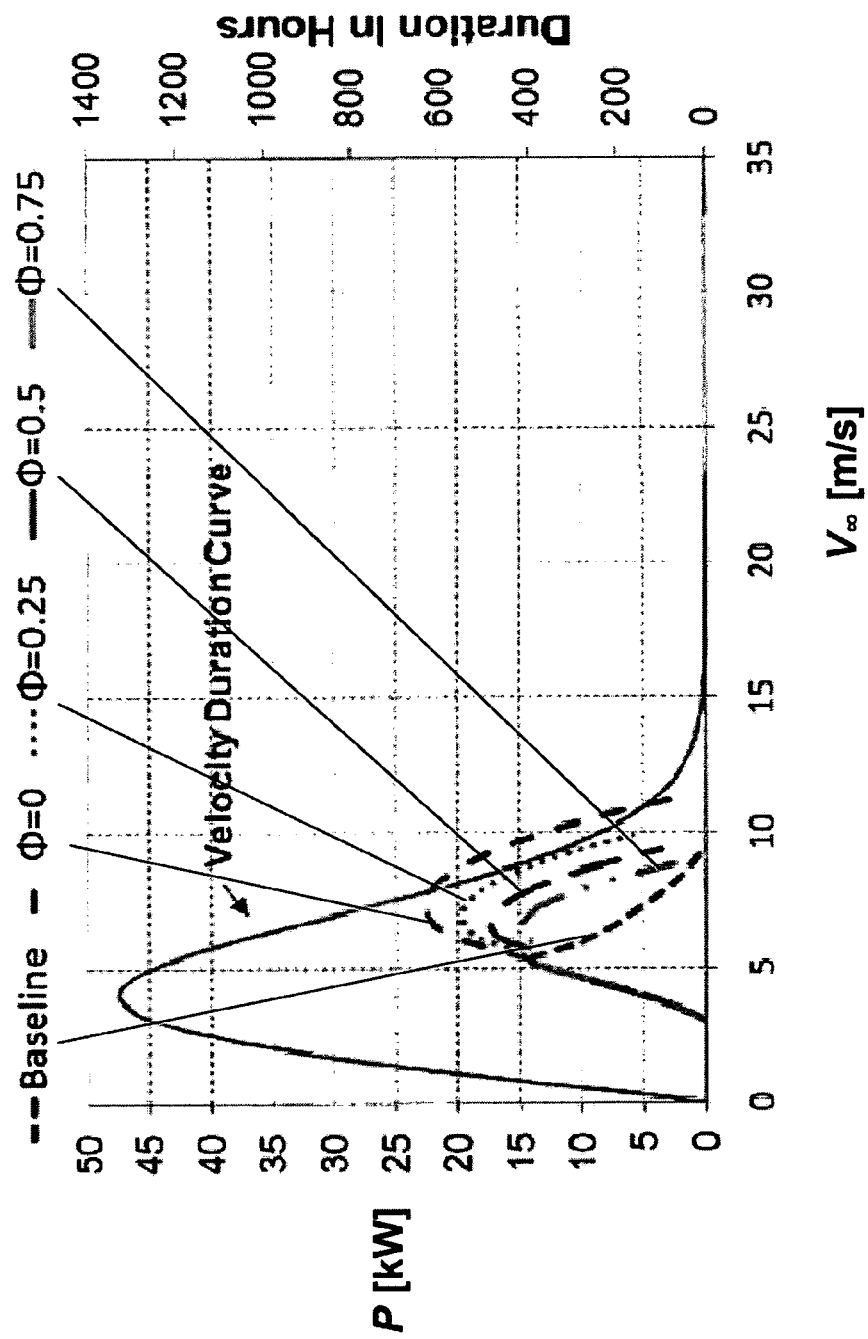
FIG. 14 is a graphical representation of different power vs wind speed curves, when a varying momentum is imparted to air flowing around the single-slot blade, each curve corresponding to a different system power loss.

FIG. 14 is a graphical representation of different power vs wind speed curves, when a varying momentum is imparted to air flowing around the blade by the single-slot blade configuration, each curve corresponding to a different system power loss. The results of the experimental data were introduced into a turbine analysis model in order to calculate the power coefficient of a VAWT, in which constant blowing is effected ($U_j$ is constant), to provide a varying momentum increase over the downwind-oriented side of the blade. For the calculation, it was theorized that the jet was kept on only when the active blade side was downwind-oriented. FIG. 14 illustrates that for wind velocities higher than about 5 m/s, the power output of the VAWT described above is higher than the baseline power output, even when $\Phi$=0.75. The velocity duration curve shows that even though wind velocities over 5 m/s are not too common, such winds still exist and may be used by such a VAWT. Despite the fact that most of the year the wind speed is in favor of the baseline case, the part of the year when the wind speed is high produced a greatly increased power in the controlled cases (i.e. in the cases in which momentum is added to the fluid flow over the blade), while the uncontrolled (baseline) turbine does not produce significant power.

Figure 15:
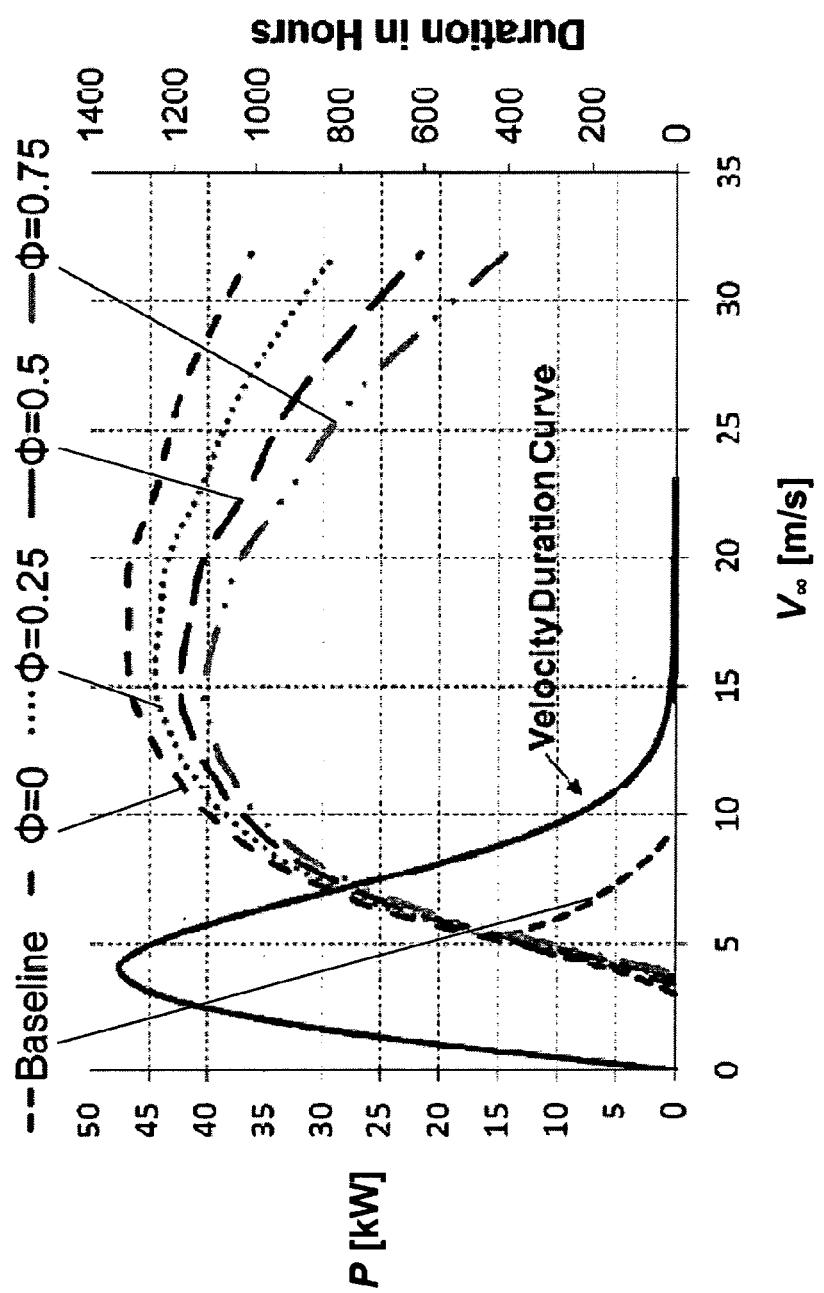
FIG. 15 is a graphical representation of different power vs wind speed curves, when oscillating momentum is imparted to air flowing around the two-slot blade, each curve corresponding to a different system power loss.

FIG. 15 is a graphical representation of different power vs wind speed curves, when oscillating momentum is imparted to air flowing around the blade by the double-slot blade configuration when $\alpha \geq 8°$, each curve corresponding to a different system power loss. The results of the experimental data were introduced into a turbine analysis model in order to calculate the power coefficient of a VAWT, in which pulsed blowing is effected, to provide a constant momentum increase over the downwind-oriented side of the blade. For the calculation, it was theorized that the controller was operated to prevent a jet from exiting via the upwind-oriented slot. FIG. 15 illustrates that for wind velocities higher than about 5 m/s, the power output of the VAWT described above is higher than the baseline power output, even when $\Phi$=0.75. The velocity duration curve shows that even though wind velocities over 5 m/s are not too common, such winds still exist and may be used by such a VAWT. Despite the fact that most of the year the wind speed is in favor of the baseline case, the part of the year when the wind speed is high produced a greatly increased power in the controlled cases (i.e. in the cases in which momentum is added to the fluid flow over the blade), while the uncontrolled (baseline) turbine does not produce significant power.

Figure 16:
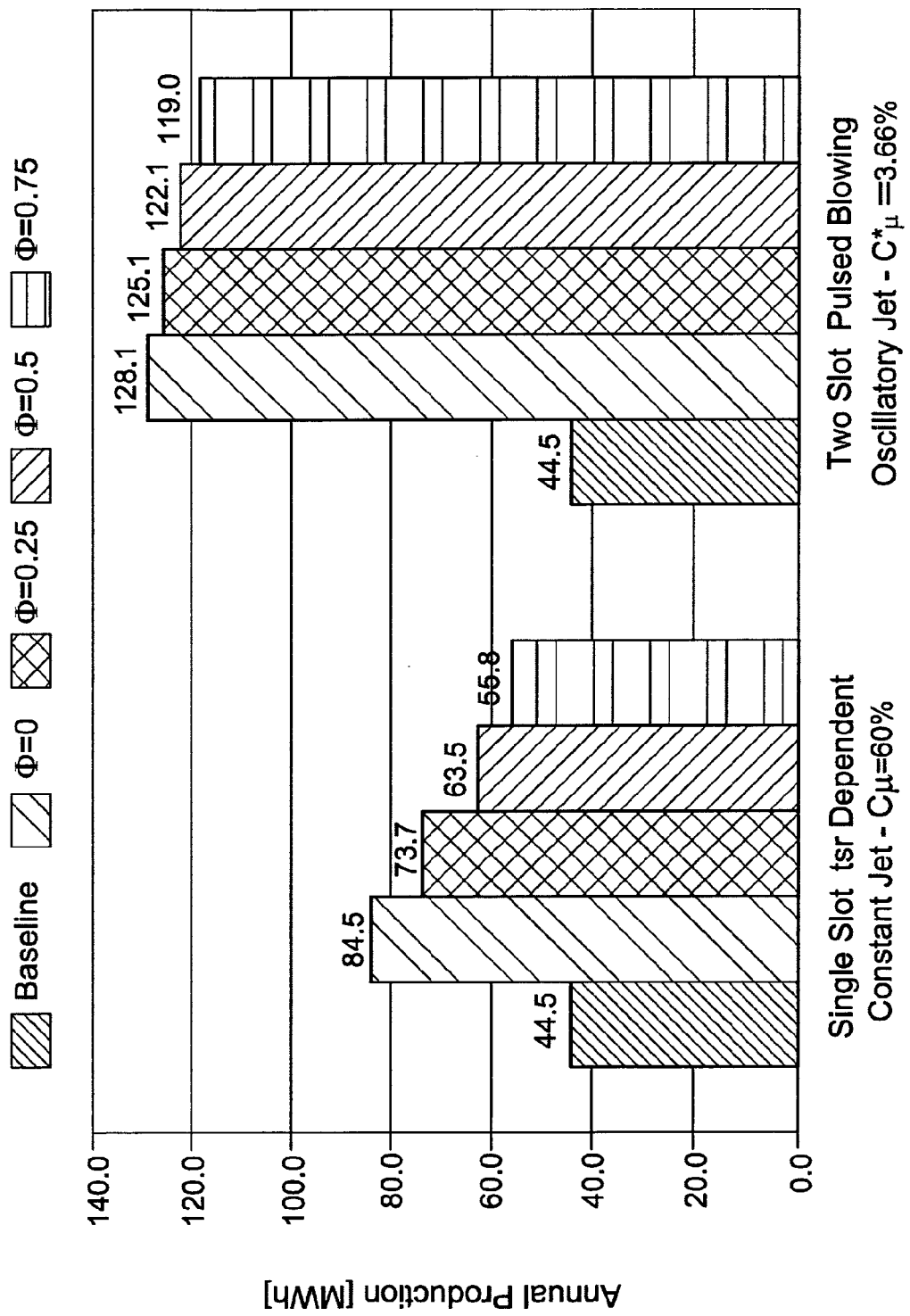
FIG. 16 is a graphical representation of power produced in a year by the single-slot blade and by the two-slot blade, accounting for different system power losses.

FIG. 16 is a graphical representation of power produced in a year by the two-slot blade and by the single-slot blade configurations, accounting for different system power losses. Using the wind duration curve appearing in FIGS. 14 and 15, it is shown that an uncontrolled (baseline) VAWT produces about 44.5 MWh in a year. In contrast, even for system losses of 0.75, a VAWT featuring a single-slot blade, producing a constant jet and $C_\mu$=60%, provide 55.8 MWh in a year. Furthermore, even accounting for system losses of 0.75, a two-slot blade with oscillating valve producing a variable jet such that $C^*_\mu$ is kept constant at 3.66%, and operating when $\alpha \geq 8°$, produces 119 MWh in a year—over 2.5 times the yearly power of the uncontrolled VAWT.

Thus, the present invention provides a simple and effective technique enabling significantly improve the performance of a VAWT.

Those skilled in the art will readily appreciate that various modifications and changes can be applied to the embodiments of the invention defined in and by the appended claims.

The invention claimed is:

1. A control system for controlling operation of a wind turbine for generating energy from an incoming fluid flow, the control system comprising:
    at least one flow affecting arrangement associated with at least one blade of the wind turbine and a control unit connected to said flow affecting arrangement,
    the flow affecting arrangement comprising two flow affecting units located in two opposite sides of the blade respectively at a leading edge thereof, each flow affecting unit being operable for creating a blowing jet at the respective side of the blade thereby inducing an increase in a fluid flow momentum,
    a position detector operable for detecting a speed and position of the blade along a circular path during rotation of the turbine and generating speed data and position data indicative of said blade speed and blade position, respectively;
    a flow detector for detecting a speed and direction of the fluid flow, and for generating flow speed data and flow direction data indicative of said flow speed and said flow directions, respectively, with respect to the blade;
    the control unit being configured and operable for selectively activating the flow affecting units in alternating fashion according to a predetermined time pattern to oscillate the blowing jet at the opposite sides of the blade, said time pattern being such that at least one of the flow affecting units is active when angle of attack satisfies a predetermined condition, the control unit comprising a processor utility responsive to said blade speed data, said blade position data, said flow speed data, and said flow direction data, for monitoring a condition of the angle of attack, and upon identifying said predetermined condition generating control signal to at least one of the flow affecting units.

2. The control system of claim 1, wherein the flow affecting arrangement comprises an electrodes' arrangement defining two pairs of electrodes associated with the opposite sides of the blade, the control unit being configured and operable to selectively activate the electrode pairs to create said blowing jet in the form of a plasma jet in the vicinity of the respective side of the blade.

3. The control system of claim 2, wherein the electrodes' arrangement comprises two electrodes located at the opposite sides of the blade and being screened from the fluid flow and an electrode located at the leading edge of the blade between and spaced-apart from said two electrodes and being exposed to the fluid flow, each of said screened electrodes forming with said exposed electrode a respective one of said two pairs of electrodes.

4. The control system of claim 1, wherein the time pattern defines time intervals for operation of said at least one flow affecting unit, said time intervals corresponding to a downwind orientation of the blade side with which said flow affecting unit is associated.

5. The control system of claim 4, wherein said time intervals correspond to a position of said blade in an upwind portion of a circular path of the wind turbine VAWT with respect to the fluid flow direction.

6. A vertical axis wind turbine (VAWT) for generating energy from an incoming fluid flow, the VAWT comprising at least one blade mounted for rotation along a circular path, and the control system configured according to claim 1.

7. A control system for controlling operation of a wind turbine for generating energy from an incoming fluid flow, the control system comprising at least one flow affecting arrangement associated with at least one blade of the wind turbine, and a control unit connected to said flow affecting arrangement, the flow affecting arrangement comprising at least one flow affecting unit located on at least one side of the blade at a leading edge thereof, the flow affecting unit being operable for creating a blowing jet at the respective side of the blade thereby inducing an increase in a fluid flow momentum, the control unit being configured and operable for selectively activate said at least one flow affecting unit according to a predetermined time pattern to oscillate the blowing jet, said time pattern being such that said at least one flow affecting unit is active when angle of attack satisfies a predetermined condition defining a relation between the angle of attack and a stall angle, the control unit operating said at least one flow affecting unit upon identifying that the blade's speed and position in a rotating wind turbine corresponds to the condition that the angle of attack is larger than the stall angle and terminates said flow affecting unit upon identifying that the angle of attack became smaller than the stall angle.

8. The control system of claim 7, wherein the flow affecting unit is in the form of a slot made in the respective side of the blade substantially at the leading edge thereof, said control unit being configured and operable for circulating a fluid flow through the hollow blade via an inlet made in one of the sides of the blade and said slot.

9. The control system of claim 7, wherein the flow affecting unit is in the form of a slot made in the respective side of the blade substantially at the leading edge thereof, the control unit comprising an oscillating valve controllably operable for selectively shifting the slot between its closed and open positions.

10. The control system of claim 7, wherein the flow affecting unit is in the form of a vortex generator shiftable between its first and second positions with respect to the respective side of the blade, said vortex generator when in the first position is inoperative with respect to the fluid flow and when in the second position is operative interacting with the fluid flow and inducing increase in the fluid flow momentum.

11. The control system of claim 7, comprising a blade detector operable for detecting a speed and position of the blade along a circular path during rotation of the turbine and generating blade speed data and blade position data indicative of said blade speed and said blade position, respectively; a flow detector detecting a speed and direction of the incoming fluid flow, and for generating flow speed data and flow direction data indicative of said flow speed and flow direction, respectively with respect to the blade; and a processor utility responsive to said blade speed data, said blade position data, said flow speed data, and said flow direction data, for monitoring a condition of the angle of attack, and upon identifying said predetermined condition generating control signal to at least one of the flow affecting units.

12. The control system of claim 7, wherein said processor utility is responsive to blade speed data, said blade position data, said flow speed data, and said flow direction data for identifying the blade position corresponding to downwind orientation of said side of the blade carrying the flow affecting unit and activating said flow affecting unit during said downwind orientation of the blade's side.

13. A control system for controlling operation of a wind turbine for generating energy from an incoming fluid flow, the control system comprising at least one flow affecting arrangement associated with at least one blade of the wind turbine, and a control unit connected to said flow affecting arrangement, the flow affecting arrangement comprising at least one flow affecting unit located on at least one side of the blade at a leading edge thereof, the flow affecting unit being operable for creating a blowing jet at the respective side of the blade thereby inducing an increase in a fluid flow momentum, the control unit being configured and operable for selectively activate said at least one flow affecting unit according to a predetermined time pattern to oscillate the blowing jet, wherein said time pattern is such that said at least one flow affecting unit is activated when the respective side of the blade is downwind oriented with respect to the fluid flow.

14. The control system of claim 13, having one of the following configurations: (a) the flow affecting unit is in the form of a slot made in the respective side of the blade substantially at the leading edge thereof, said control unit being configured and operable for circulating a fluid flow through the hollow blade via an inlet made in one of the sides of the blade and the slots; (b) the flow affecting unit is in the form of a slot made in the respective side of the blade substantially at the leading edge thereof, the control unit comprising an oscillating valve controllably operable for selectively shifting each of the slots between its closed and open positions; and (c) the flow affecting unit is in the form of a vortex generator shiftable between its first and second positions with respect to the respective side of the blade, said vortex generator when in the first position is inoperative with respect to the fluid flow and when in the second position is operative interacting with the fluid flow and inducing increase in the fluid flow momentum.

15. A method for controlling operation of a wind turbine for generating energy from an incoming fluid flow, wherein said wind turbine comprises at least one blade having at least one active side associated with at least one controllable flow affecting arrangement, the method comprising:

monitoring a speed and orientation of the incoming fluid;

monitoring a speed and orientation of said at least one blade of the rotating wind turbine;

analyzing data indicative of the speed and orientation of the incoming fluid and data indicative of speed and orientation of said at least one blade, and determining said blade's orientation and an angle of attack relative to said incoming fluid; and selectively operating said at least one controllable flow affecting arrangement for increasing momentum of a first portion of said fluid flowing on said active side, upon identifying that said active side is downwind oriented with respect to the incoming fluid flow and that said angle of attack satisfies a predetermined condition.

16. The method of claim 15, wherein said blade comprises two active sides opposite to each other with respect to a chord of said blade.

17. The method of claim 16, further comprising controlling operation of the two active sides to ensure that when the flow affecting arrangement on one of the active sides is operative, the flow affecting arrangement on the opposite side is inoperative to thereby ensure that momentum is not increased on a second portion of said fluid flowing along said opposite active side.

18. The method of claim 15, wherein said condition defines a relation between said angle of attack and a stall angle.

19. The method of claim 15, comprising operating the flow affecting arrangement upon identifying that the respective blade is positioned in an upwind portion of a circular path of the wind turbine with respect to the fluid flow direction.

20. A control system for controlling operation of a wind turbine for generating energy from an incoming fluid flow, the control system comprising:

at least one flow affecting arrangement associated with at least one blade of the wind turbine and a control unit connected to said flow affecting arrangement, the flow affecting arrangement comprising two flow affecting units located in two opposite sides of the blade respectively at a leading edge thereof, each flow affecting unit being operable for creating a blowing jet at the respective side of the blade thereby inducing an increase in a fluid flow momentum, the flow affecting unit comprising an electrodes' arrangement defining at least two pairs of electrodes associated with the opposite sides of the blade, including at least two electrodes screened from the fluid flow and an electrode located at the leading edge of the blade between and spaced-apart from said at least two electrodes and being exposed to the fluid flow, each of said screened electrodes forming with the exposed electrode a respective one of said at least two pairs of electrodes, the control unit being configured and operable for selectively activating the flow affecting units in alternating fashion, by activating the electrode pairs, according to a predetermined time pattern to oscillate the blowing jet at the opposite sides of the blade and create said blowing jet in the form of a plasma jet in the vicinity of the respective side of the blade.

21. A control system for controlling operation of a wind turbine for generating energy from an incoming fluid flow, the control system comprising at least one flow affecting arrangement associated with at least one blade of the wind turbine and a control unit connected to said flow affecting arrangement, the flow affecting arrangement comprising two flow affecting units located in two opposite sides of the blade respectively at a leading edge thereof, each flow affecting unit being operable for creating a blowing jet at the respective side of the blade thereby inducing an increase in a fluid flow momentum, the control unit being configured and operable for selectively activating the flow affecting units in alternating fashion according to a predetermined time pattern to oscillate the blowing jet at the opposite sides of the blade, the time pattern being such that at least one of the flow affecting units is active when angle of attack satisfies a predetermined condition defining a relation between the angle of attack and a stall angle, the control unit operating at least one of the flow affecting units upon identifying that the blade's speed and position in a rotating wind turbine correspond to the condition that the angle of attack is larger than the stall angle and terminates said flow affecting unit upon identifying that the angle of attack became smaller than the stall angle.

22. The control system of claim 21, comprising a position detector operable for detecting a speed and position of the blade along a circular path during rotation of the turbine and generating speed data and position data indicative of said blade speed and blade position, respectively; a flow detector for detecting a speed and direction of the fluid flow, and for generating flow speed data and flow direction data indicative of said flow speed and said flow directions, respectively, with respect to the blade; and a processor utility responsive to said blade speed data, said blade position data, said flow speed data, and said flow direction data, for monitoring a condition of the angle of attack, and upon identifying said predetermined condition generating control signal to at least one of the flow affecting units.

23. The control system of claim 21, wherein the flow affecting arrangement comprises an electrodes' arrangement defining at least two pairs of electrodes associated with the opposite sides of the blade, the control unit being configured and operable to selectively activate the electrode pairs to create said blowing jet in the form of a plasma jet in the vicinity of the respective side of the blade.

24. The control system of claim 23, wherein the electrodes' arrangement comprises two electrodes located at the opposite sides of the blade and being screened from the fluid flow and an electrode located at the leading edge of the blade between and spaced-apart from said two electrodes and being exposed to the fluid flow, each of said screened electrodes forming with said exposed electrode a respective one of said two pairs of electrodes.

25. The control system of claim 21, having one of the following configurations: (a) the flow affecting unit is in the form of a slot made in the respective side of the blade substantially at the leading edge thereof, said control unit being configured and operable for circulating a fluid flow through the hollow blade via an inlet made in one of the sides of the blade and the slots; (b) the flow affecting unit is in the form of a slot made in the respective side of the blade substantially at the leading edge thereof, the control unit comprising an oscillating valve controllably operable for selectively shifting each of the slots between its closed and open positions; and (c) the flow affecting unit is in the form of a vortex generator shiftable between its first and second positions with respect to the respective side of the blade, said vortex generator when in the first position is inoperative with respect to the fluid flow and when in the second position is operative interacting with the fluid flow and inducing increase in the fluid flow momentum.

26. A control system for controlling operation of a wind turbine for generating energy from an incoming fluid flow, the control system comprising:
- at least one flow affecting arrangement associated with at least one blade of the wind turbine, the flow affecting arrangement comprising at least one flow affecting unit located on at least one side of the blade at a leading edge thereof, the flow affecting unit being operable for creating a blowing jet at the respective side of the blade thereby inducing an increase in a fluid flow momentum;
- a blade detector operable for detecting a speed and position of the blade along a circular path during rotation of the turbine and generating blade speed data and blade position data indicative of said blade speed and said blade position, respectively;
- a flow detector detecting a speed and direction of the incoming fluid flow, and for generating flow speed data and flow direction data indicative of said flow speed and flow direction, respectively with respect to the blade; and
- a control unit connected to said flow affecting arrangement, the flow affecting arrangement comprising at least one flow affecting unit located on at least one side of the blade at a leading edge thereof, the flow affecting unit being operable for creating a blowing jet at the respective side of the blade thereby inducing an increase in a fluid flow momentum, the control unit being configured and operable for selectively activate said at least one flow affecting unit according to a predetermined time pattern to oscillate the blowing jet, the control unit comprising a processor utility responsive to said blade speed data, said blade position data, said flow speed data, and said flow direction data, for monitoring a condition of the angle of attack, and upon identifying said predetermined condition generating control signal to at least one of the flow affecting units.

27. The control system of claim 26, wherein said time pattern is such that at least one of the flow affecting units is active when angle of attack satisfies a predetermined condition.

28. The control system of claim 27, wherein said predetermined condition defines a relation between the angle of attack and a stall angle.

29. The control system of claim 28, wherein the control unit operates at least one of the flow affecting units upon identifying that the blade's speed and position in a rotating wind turbine correspond to the condition that the angle of attack is larger than the stall angle and terminates said flow affecting unit upon identifying that the angle of attack became smaller than the stall angle.

30. The control system of claim 27, wherein the flow affecting unit is in the form of a slot made in the respective side of the blade substantially at the leading edge thereof, said control unit being configured and operable for circulating a fluid flow through the hollow blade via an inlet made in one of the sides of the blade and the slots.

31. The control system of claim 27, wherein the flow affecting unit is in the form of a slot made in the respective side of the blade substantially at the leading edge thereof, the control unit comprising an oscillating valve controllably operable for selectively shifting each of the slots between its closed and open positions.

32. The control system of claim 27, wherein the flow affecting unit is in the form of a vortex generator shiftable between its first and second positions with respect to the respective side of the blade, said vortex generator when in the first position is inoperative with respect to the fluid flow and when in the second position is operative interacting with the fluid flow and inducing increase in the fluid flow momentum.

33. A control system for controlling operation of a wind turbine for generating energy from an incoming fluid flow, the control system comprising at least one flow affecting arrangement associated with at least one blade of the wind turbine and a control unit connected to said flow affecting arrangement, the flow affecting arrangement comprising two flow affecting units located in two opposite sides of the blade respectively at a leading edge thereof, each flow affecting unit being operable for creating a blowing jet at the respective side of the blade thereby inducing an increase in a fluid flow momentum, the control unit being configured and operable for selectively activating the flow affecting units in alternating fashion according to a predetermined time pattern to oscillate the blowing jet at the opposite sides of the blade, the time pattern defining time intervals for operation of said at least one flow affecting unit, said time intervals corresponding to a downwind orientation of the blade side with which said flow affecting unit is associated.

* * * * *